US010067673B2

(12) United States Patent
Uehara et al.

(10) Patent No.: US 10,067,673 B2
(45) Date of Patent: Sep. 4, 2018

(54) MANAGEMENT SYSTEM FOR STORAGE SYSTEM

(71) Applicant: HITACHI, LTD., Tokyo (JP)

(72) Inventors: Tetsuya Uehara, Tokyo (JP); Akira Shirasu, Tokyo (JP); Katsutoshi Asaki, Tokyo (JP); Yasufumi Uchiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 15/120,865

(22) PCT Filed: Sep. 29, 2014

(86) PCT No.: PCT/JP2014/075796
§ 371 (c)(1),
(2) Date: Aug. 23, 2016

(87) PCT Pub. No.: WO2016/051445
PCT Pub. Date: Apr. 7, 2016

(65) Prior Publication Data
US 2016/0357439 A1 Dec. 8, 2016

(51) Int. Cl.
*G06F 3/06* (2006.01)
(52) U.S. Cl.
CPC ........... *G06F 3/0604* (2013.01); *G06F 3/067* (2013.01); *G06F 3/0607* (2013.01); *G06F 3/0617* (2013.01); *G06F 3/0629* (2013.01); *G06F 3/0647* (2013.01); *G06F 3/0683* (2013.01)
(58) Field of Classification Search
None
See application file for complete search history.

(56) References Cited

U.S. PATENT DOCUMENTS

| 2004/0049553 | A1 | 3/2004 | Iwamura et al. |
| 2007/0245110 | A1* | 10/2007 | Shibayama ........... G06F 3/0605 711/165 |
| 2008/0270720 | A1* | 10/2008 | Tanabe ................. G06F 3/0605 711/162 |
| 2010/0293412 | A1 | 11/2010 | Sakaguchi et al. |
| 2012/0084501 | A1 | 4/2012 | Watanabe et al. |
| 2015/0088821 | A1* | 3/2015 | Blea ................... G06F 17/30079 707/624 |

FOREIGN PATENT DOCUMENTS

| JP | 2004-102374 A | 4/2004 |
| JP | 2009-276830 A | 11/2009 |
| JP | 2010-266993 A | 11/2010 |
| JP | 2012-079199 A | 4/2012 |

* cited by examiner

Primary Examiner — Denise Tran
(74) Attorney, Agent, or Firm — Volpe and Koenig, P.C.

(57) ABSTRACT

A management system receives a job definition condition that defines a migration job corresponding to partial migration that is part of data migration for replacement from a replace source storage system to a replace target storage system. The management system selects one or more source volumes and creates a migration job for the one or more source volumes in accordance with the job definition condition. The migration job is a job in which, for each of the one or more source volumes, a target volume is created in the replace target storage system, and in which data is migrated from each of the one or more source volumes to a corresponding one of the one or more target volumes. The management system executes each of a plurality of migration jobs.

7 Claims, 33 Drawing Sheets

FIG. 4

Storage management table
402

| Storage number/name | Type | Belonging-ID |
|---|---|---|
| 51 / TTT | Physical | - |
| 00 / SSS | Physical | - |
| 61 / VVV | Virtual | 51 |
| ... | ... | ... |

FIG. 5

Resource management table
403

| RG number/name | Belonging-ID | Resource details |
|---|---|---|
| A / Business | 00 | PG#: 00, 01<br>Pool#: 00<br>VOL#: 00, 01<br>Port#: 00, 01 |
| - | 01 | PG#: 00 to 03<br>Pool#: 00<br>Port#: 00 to 05 |
| ... | ... | ... |

FIG. 6

VOL management table
600

| VOL number | Overall/free | Type | Belonging-ID | Base ID | Status |
|---|---|---|---|---|---|
| 00 | 500GB /200GB | TPVOL | 00-A | Pool#00 | Normal |
| 31 | 200GB /50GB | RVOL | - | PG#40 | Error |
| ... | ... | ... | ... | ... | ... |

FIG. 7

Pool management table
700

| Pool number | Belonging-ID | Pool VOL list | Status |
|---|---|---|---|
| 00 | 00-A | 00, 01 | Normal |
| ... | ... | ... | ... |

FIG. 8

PG management table
800

| PG# | Belonging target ST# | RAID level | PDEV# | Type | Capacity | Status |
|---|---|---|---|---|---|---|
| 00 | 10 | 10 | 00, 01, 02, 03 | SSD | 1,000 GB | Normal |
| ... | ... | ... | ... | ... | ... | ... |

FIG. 9

Port management table
900

| Port number | Belonging-ID | HG list | WWN | Name | LUN list | Status |
|---|---|---|---|---|---|---|
| 00 | 00-A | 00 | 00.00.... | CL1-A | 00, 01 | Normal |
| ... | ... | ... | | ... | ... | ... |

FIG. 10

LUN management table
1000

| LUN | VOL number | Belonging-ID | LUN security | HG number |
|---|---|---|---|---|
| 00 | 00 | 00-A | R/W enabled | 05 |
| ... | ... | ... | | ... |

FIG. 11

HG management table
1100

| HG number | Host list |
|---|---|
| 00 | A, B |
| ... | ... |

FIG. 12

Pair management table
1200

| Pair # | Primary ID | Secondary ID |
|---|---|---|
| 00 | 00, 00-A | 06, 00-A |
| ... | ... | ... |

FIG. 13

History management table
1250

|  | History |
|---|---|
| Project | ... |
| Job | ... |
| Task | ... |

FIG. 14

Project management table
1400

| Project number | Common setup contents | Job list/status | |
|---|---|---|---|
| | | Job number | Status |
| 0 | (*) Source storage system #00 - Target storage system #51 (virtual storage system #61)<br>(*) Source external connection port #09 -Target external connection port #59<br>(*) Replace source unit (source I/O port number and the like) - Replace target unit (target I/O port number and the like)<br>... | A<br>B<br>C<br>... | Completed<br>Completed<br>Running<br>... |
| ... | ... | ... | ... |

FIG. 15

Job management table
<u>1500</u>

| Job number/name/ status | Belonging-ID | Step number | Step details | Task list | Status |
|---|---|---|---|---|---|
| A /DEF /Completed | 0 | 1 | Associate alternate I/O path *(=...)* with target VOL. | 11 | Completed |
| | | 2 | Make alternate I/O path *(=...)* online and make original I/O path *(=...)* offline. | 21 | Completed |
| | | 3 | Enable target side cache *(=...)* and disable source-side cache *(=...)*. | 31, 32 | Completed |
| | | 4 | Migrate pair *(=...)* configuration. | 41 | Completed |
| | | 5 | VOL migration *(=...)* | 51 | Completed |
| ... | ... | ... | ... | ... | ... |

FIG. 16

Task management table
<u>1600</u>

| Task number | Belonging-ID | Task details | Status |
|---|---|---|---|
| 11 | 0-A-1 | ... | Completed |
| ... | ... | ... | ... |

FIG. 22

Create job

Specify the criteria to select the source volumes and the selected volumes.

● Hosts: Host#A   ▷   Host#A, #B....

○ Manual

Selected source volumes

| VOL number | Host number | WWN |
|---|---|---|
| 00 | A | 00.00.... |
| 01 | A | 00.00.... |

Submit   Cancel

FIG. 24

Virtualize and Allocate Volumes　2400

|  | Target storage | 61 in 51 |
|---|---|---|
|  | Source storage | 00 |
|  | Job name | DEF |

Verify Internal-Storage Path Configuration　2401

External paths

| Path priority | Source storage system | | Target storage system | |
|---|---|---|---|---|
|  | ST# | Port# | ST# | Port# |
| 1 | 00 | 18 | 61 (in ST#51) | 58 |

I/O paths　2402

| | Original I/O path | | Alternate I/O path | |
|---|---|---|---|---|
| Source storage system | Source I/O port | Target storage system | Target I/O port | Host# |
| 00 | 00 | 51 | 00 | A |
| 00 | 01 | 51 | 01 |  |

2403

[Submit] [Cancel]

FIG. 25

Switching I/O paths from host to volume

Step 1: Configure following paths to online for each hosts. After configuring, confirm that following paths are online with the path management program.

I/O Path Information For Target Storage System — 2501

Column Settings

| Host | Host Port WWN | VOL# | LUN | Storage Port WWN | Storage Port Name |
|---|---|---|---|---|---|
| A | 00.00.00.0 | 00 | 00 | 00.00.... | CL2-A |

Export to CSV — 2502

Step 2: Configure following paths to offline for each hosts. After configuring, confirm that following paths are online with the path management program.

I/O Path Information For Source Storage System — 2503

Column Settings

| Host | Host Port WWN | VOL# | LUN | Storage Port WWN | Storage Port Name |
|---|---|---|---|---|---|
| A | 00.00.00.0 | 00 | 00 | 00.00.... | CL2-A |

Export to CSV — 2504

Submit     Cancel

MANAGEMENT SYSTEM FOR STORAGE SYSTEM

TECHNICAL FIELD

The present invention generally relates to management of a storage system, and for example, to management of replacement of a storage system.

BACKGROUND ART

In a technique disclosed in PTL 1, a technique which performs data migration from a source storage system to a target storage system is disclosed. More specifically, PTL 1 indicates that a data migration apparatus copies a configuration from the migration source storage system to the migration target storage system before data migration to reduce failures in data migration resulting from mis-configuration.

CITATION LIST

Patent Literature

[PTL 1]
Japanese Patent Application Laid-open No. 2004-102374

SUMMARY OF INVENTION

Technical Problem

A replace operation for the storage system including the above-described data migration is not always prevented from affecting normal operations (during operation) and is thus preferably performed during hours with low operational loads (for example, for banks, on a holiday or during out-duty hours). The "hours with low operational loads" may be hours when operations are suspended.

However, in recent years, storage systems have been large in scale and complicated, and an increasing number of host computers have accessed the storage system or the host computers have also been complicated. Thus, replacement of the storage system takes a long time, and it is difficult to replace the storage system while suppressing adverse effects on operations.

Solution to Problem

A management system for replacement of a storage system is constructed. Replacement of the storage system includes, in addition to data migration that is migration of data in a volume set held by a replace source storage system to a replace target storage system, a related process for the data migration in which a host is able to use the replace target storage system similarly to the replace source storage system. An example of the related process may include a process in which, when a host group is configured for a port with which a source volume (the volume of the migration source) is associated, the same host group is associated with a port with which a target volume (the volume of the migration target) is associated. Furthermore, an example of the related process may include a process in which, when a security attribute (for example, read and write are enabled or only read is enabled) is associated with the source volume, the same security attribute is associated with the target volume. After replacement of the storage system, instead of the source volume provided by the replace source storage system, the target volume provided by the replace target storage system can be accessed similarly to the source volume provided by the replace source storage system. In this regard, replacement of the storage system is different from simple volume migration in which data is migrated from the volume in one of the storage systems to the volume in the other storage system.

The management system receives a job definition condition that defines a migration job corresponding to partial migration that is a part of data migration for replacement. In accordance with the job definition condition, the management system selects one or more volumes from the volume set of the replace source storage system as one or more source volumes and creates a migration job for the selected one or more source volumes. The migration job is a job in which, for each of the one or more source volumes, a target volume is created in the replace target storage system, and in which data is migrated from each of the one or more source volumes to a corresponding one of the one or more target volumes. The management system respectively executes a plurality of migration jobs respectively corresponding to a plurality of partial migrations included in the data migration job for replacement.

Advantageous Effects of Invention

The storage system can be replaced with adverse effects on operations suppressed.

BRIEF DESCRIPTION OF DRAWINGS

FIG. 4 is a diagram depicting a configuration of a storage management table.
FIG. 5 is a diagram depicting a configuration of an RG (resource group) management table.
FIG. 6 is a diagram depicting a configuration of a VOL (volume) management table.
FIG. 7 is a diagram depicting a configuration of a pool management table.
FIG. 8 is a diagram depicting a configuration of a PG (parity group) management table.
FIG. 9 is a diagram depicting a configuration of a port management table.
FIG. 10 is a diagram depicting a configuration of LUN (logical unit number) management table.
FIG. 11 is a diagram depicting a configuration of an HG (host group) management table.
FIG. 12 is a diagram depicting a configuration of a pair management table.
FIG. 13 is a diagram depicting a configuration of a progress history management table.
FIG. 14 is a diagram depicting a configuration of a project management table.
FIG. 15 is a diagram depicting a configuration of a job management table.
FIG. 16 is a diagram depicting a configuration of task management table.

FIG. 22 is a diagram depicting a job creation screen.

FIG. 24 is a diagram depicting a target VOL creation screen.

FIG. 25 is a diagram depicting an I/O (input/output) path change screen.

DESCRIPTION OF EMBODIMENTS

Figure 1:
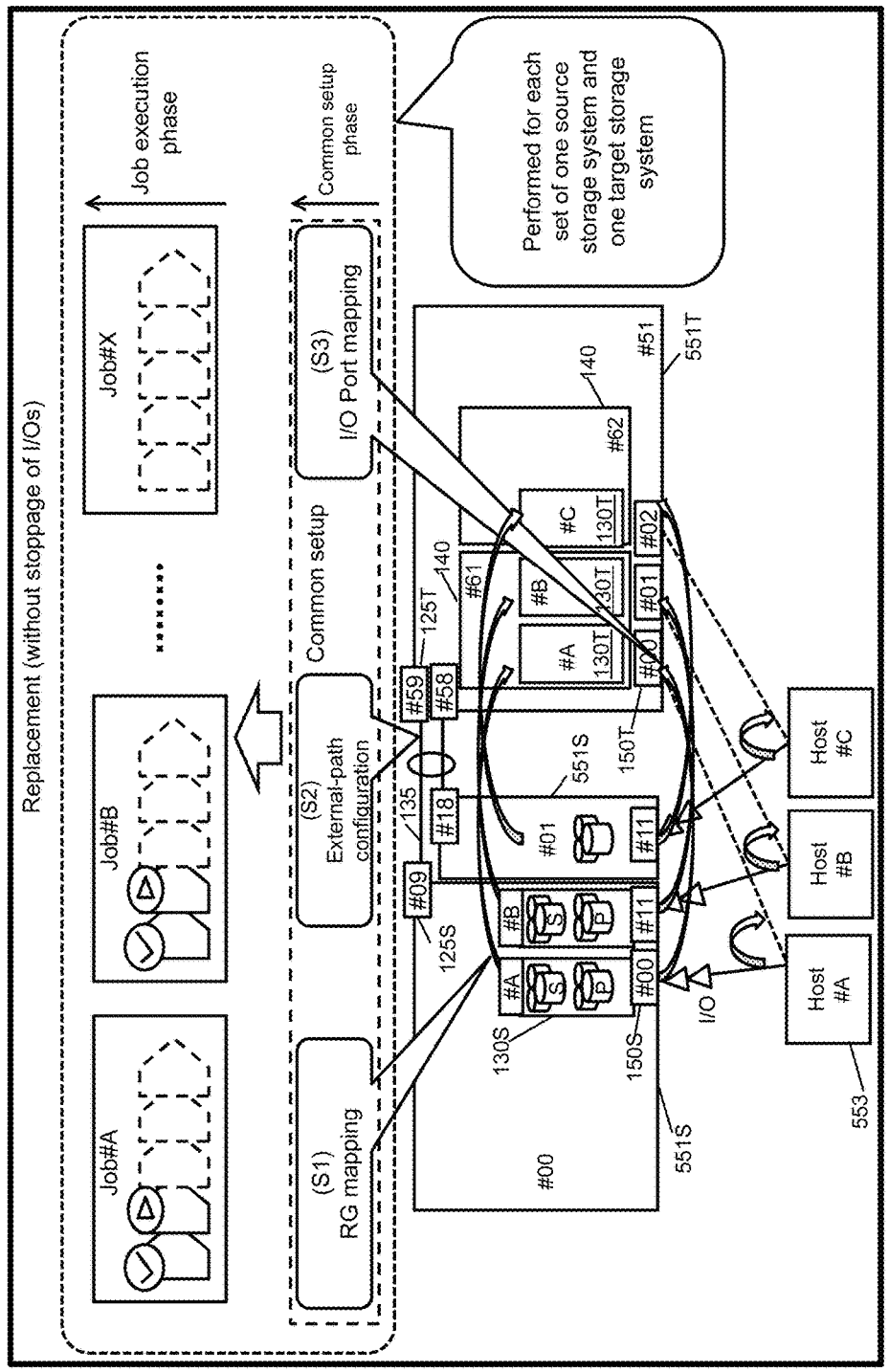
FIG. 1 is a schematic diagram depicting an outline of an embodiment.

An embodiment will be described.

In the following description, information may be described using an expression "kkk table". However, the information may be expressed using a data configuration other than the tables. To indicate independence from the data configuration, at least one of the "kkk tables" may be referred to as "kkk information".

Furthermore, in the following description, at least one of a "number" and a "name" is used as identification information for elements. However, instead of or in addition to the at least one of the "number" and the "name", another type of identification information may be adopted.

In the following description, a process may be described using a "program" as a subject. However, the program is executed by a processor (for example, a CPU (central processing unit)) to perform a designated process using a storage resource (for example, a memory) and/or a communication interface device (for example, a communication port)) and the like. Thus, the subject of the process may be the processor. The process described using the program as a subject may be a process executed by the processor or an apparatus having the processor. Furthermore, the processor may include a hardware circuit that executes a part or all of the process. The program may be installed in an apparatus such as a computer through a program source. The program source may be, for example, a program distribution server, or a storage medium that can be read by a computer. When the program source is a program distribution server, the program distribution server includes a processor (for example, a CPU) and a storage resource. The storage resource further stores a distribution program and a program to be distributed. A processor in the program distribution server executes the distribution program to distribute the program to be distributed to another computer.

Furthermore, the management system may include one or more computers. Specifically, for example, when a management computer displays information (specifically, when the management computer displays information on a display device of the management computer or transmits display information to a remote display computer), the management computer is the management system. In addition, for example, when a plurality of computers implements functions similar to the functions of the management computer, the plurality of computers (that may include a display computer if the display computer performs display) is the management system. Input of information to the computer and output of information from the computer may be performed via an I/O device provided in the computer. Examples of the I/O device include a display device, a keyboard, and a pointing device. However, instead of or in addition to these devices, another device may be adopted. As an alternative to the I/O device, a serial interface device or an Ethernet interface device (Ethernet is a registered trade mark) may be adopted. Furthermore, a display computer having a display device, a keyboard, and a pointer device may be coupled to such an interface device. Then, information may be output (for example, displayed) and input by the computer transmitting display information to the display computer and receiving input information from the display computer. In the present embodiment, a management server 557 is the management computer, and a management client 555 is the display computer.

Furthermore, in the following description, "VOL" is an abbreviation of a volume (logical volume) and represents a logical storage device. The VOL may be a tangible VOL (RVOL) or a virtual VOL (VVOL). The VOL may include an online VOL provided to a host computer coupled to a storage system that provides the VOL and an offline VOL not provided to the host computer (not recognized by the host computer). The "RVOL" is a VOL based on a physical storage resource held by a storage system having the RVOL (for example, a RAID (redundant array of independent (or inexpensive) disks) group including a plurality of PDEVs). Examples of the "VVOL" may include an externally coupled VOL (EVOL) that is a VOL based on a storage resource (for example, a VOL) of an external storage system coupled to a storage system having the VVOL and used in accordance with a storage virtualization technique, a VOL (TPVOL) including a plurality of virtual pages (virtual storage areas) and used in accordance with a capacitive virtualization technique (typically thin provisioning), and a snapshot VOL provided as a snapshot of an original VOL. The TPVOL is typically an online VOL. The snapshot VOL may be an RVOL. "PDEV" is an abbreviation of a nonvolatile physical storage device and is typically an auxiliary storage device. A plurality of PDEVs may be included in a plurality of RAID groups. The RAID group may be referred to as a parity group, and the "RAID group" is hereinafter referred to as a "parity group". A "pool" is a logical storage area (for example, a set of a plurality of pool VOLs) and may be prepared for each application. Examples of the pool may include a TP pool and a snapshot pool. The TP pool is a storage area including a plurality of real pages (tangible storage areas). Real pages from the TP pool may be allocated to virtual pages in the TPVOL. The snapshot pool may be a storage area in which data retracted from an original VOL is stored. The "pool VOL" is a VOL that is a component of a pool. The pool VOL may be an RVOL or an EVOL. The pool VOL is typically an offline VOL.

Furthermore, in the following description, an operation performed on a GUI (graphical user interface) screen serving as a management screen for a computer system, by a user using an input device is referred to as a "user operation". The input device used for the user operation is generally a combination of a keyboard and a pointing device or a touch screen.

Furthermore, in the following description, to distinguishably describe the same type of elements, reference numerals for the elements (for example, 551S) or identification information assigned to the elements (for example, numbers "00") may be used. To describe the same type of elements without distinction, a common portion of the reference numerals for the elements (for example, 551 of 551S and 551T) may be used. When the identification information is used instead of the reference numerals, the symbol "#" is used.

Furthermore, in the following description, a "replace source storage system" may be referred to as a "source storage system", and a "replace target storage system" may be referred to as a "target storage system".

<Outline of the Embodiment>

FIG. 1 is a schematic diagram depicting an outline of the present embodiment.

For one target storage system 551T, one or more source storage systems 551S are provided. Each source storage system 551S provides a VOL to a host computer (hereinafter referred to as a host) 553 and receives an I/O request specifying the VOL from the host 553. The target storage system 551T provides a virtual storage system 140 to each of the source storage systems 551S. The virtual storage system 140 is virtually recognized as one storage system. One or more replacements corresponding to one or more source storage systems 551S allow one or more virtual storage systems 140 corresponding to the respective source storage systems 551S to be aggregated into one target storage system 551T. In other words, replacement from each of the one or more source storage system 551S to the respective target storage systems 551T is performed. In an example in FIG. 1, two virtual storage system #61 and #62 corresponding to the respective source storage systems #00 and #01 are prepared in the target storage system 551T. Replacement from each of the two source storage systems #00 and #01 to the target storage system 551T is performed.

In other words, the source storage systems 551S correspond to the virtual storage systems 140 in the target storage system 551T on a one-to-one basis.

The storage system 551 is a physical storage system. The physical storage system has a plurality of physical resources and provides a logical resource (for example, a VOL). The plurality of physical resources includes, for example, a plurality of PDEVs, a plurality of ports, and a controller (for example, a device that includes a memory such as a cache memory, and a processor that controls I/Os (inputs/outputs) to and from the plurality of PDEVs). At least one storage system 551 may have a function to provide a resource group (hereinafter referred to as an "RG") 130. The RG 130 is an example of an LPAR (logical partition) created based on a virtulization technique for the storage system 551 and is a logical storage system to which a physical resource held by the storage system 551 is allocated and which provides a logical resource. For example, the RG#A has, as resources, an I/O port (a port that receives I/O requests) #00, a primary VOL, and a secondary VOL with which the primary VOL is paired. Replacement from the source storage systems 551S to the target storage system 551T may be performed in units of RGs. For some RGs, replacement from the source storage systems 551S to the target storage system 551T may not be performed. In other words, some RGs may be left in the source storage systems 551S. In other words, even though replacement has been performed, not all the RGs 130 in the source storage systems 551S may be subjected to replacement to the target storage system 551T.

As described above, replacement of the storage systems includes, in addition to data migration, the related process for the data migration in which the host is able to use the target storage system similarly to the source storage systems. However, for the replacement, the data migration and all the related processes are scheduled so that operations may be performed according to the schedule. However, making a detailed schedule for the overall replacement takes a long time, thus delaying the start of replace operations, resulting in the need for a long time for the replacement. In particular, in recent years, storage systems have been large in scale and complicated, and an increasing number of host computers (hereinafter referred to as hosts) have accessed the storage system or the host computers have also been complicated. This also extends the time needed for replacement.

Thus, in the present embodiment, data migration is divided into a plurality of migration jobs (partial migrations) so that the migration may be performed in units of migration jobs (the migration job is hereinafter simply referred to as the "job"). Through examinations, the inventors have discovered those of configuration items needed for replacement which are common to a plurality of jobs (for example, items of information that need to be configured for main cases). Common configuration in which information is configured for the configuration items is performed before the data migration (job execution).

The common configuration includes RG mapping, external-path configuration, and I/O port mapping. In the common configuration, for example, the external-path configuration (S2) is performed after the RG mapping (S1). The I/O port mapping (S3) is performed after the external-path configuration. The "RG mapping" refers to associating a source 1305 that is an RG in the replace source (for example, an RG#A) with a target RG 130T that is an RG in the replace target (for example, an RG denoted by the same number A). When no RG 130 is present, the RG mapping may be skipped. The "external-path configuration" is configuration in which a path (hereinafter referred to as an external path)

135 is set between a source external connection port that is an external connection port of the replace source (the port to which an external storage system is coupled) and a target external connection port 125T that is an external connection port of the replace target. The "I/O port mapping" refers to associating a source I/O port 150S that is an I/O port of the replace source with a target I/O port 150T that is an I/O port of the replace target.

After the common configuration as described above, job creation and job execution are carried out. A timing for the job creation and a timing for the job execution may be set in accordance with a predetermined rule or may be optionally determined by the user. Two or more of a plurality of jobs may be executed in parallel. For example, while one job (for example, a job #A) is in execution, another job (for example, a job #B) may be created and executed. The job execution allows a VOL to migrate from the source storage system 551S to the target storage system 551.

To avoid confusing descriptions with one another, replacement from one source storage system 551S to one target storage system 551T is hereinafter sometimes referred to as a "project", and one or more projects corresponding to the respective source storage systems 551S are hereinafter sometimes referred to as a "plan". Therefore, a plurality of jobs is present for one project. The common configuration and the job execution are carried out for each project (a set of one source storage system and one target storage system). In an example in FIG. 1, two source storage systems 551S are provided for one target storage system 551T, and thus, two projects are present. Therefore, the common configuration and the job execution are carried out for each of the two projects.

One job includes a plurality of steps. A job is allowed to include only one step, but one job typically includes a plurality of steps. Each step is completed when one or more tasks corresponding to the step are completed.

Therefore, the scale of process units increases in an order of tasks, steps, jobs, projects, and plans.

The present embodiment will be described below in detail.

<Configuration of the Information Processing System>

Figure 2:
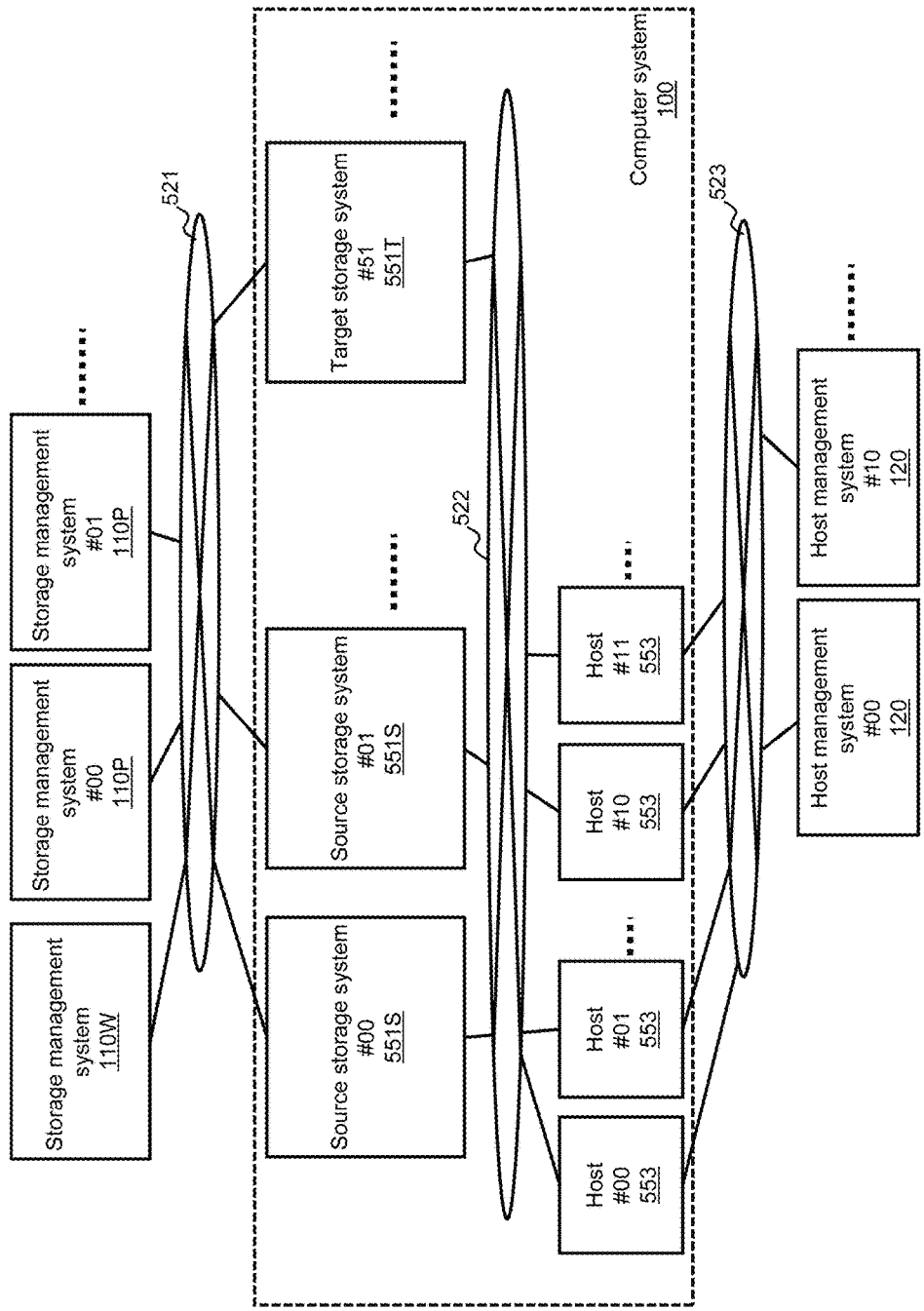
FIG. 2 is a diagram depicting a configuration of an information processing system according to the embodiment.

FIG. 2 depicts a configuration of an information processing system according to the present embodiment.

The information processing system has a computer system 100, storage management system 110, and a host management system 120.

The computer system 100 has a plurality of storage systems 551 (one or more source storage systems 551S and a target storage system. 551T) and a plurality of hosts 553. The plurality of hosts 553 is coupled to the plurality of storage systems 551 via a communication network (for example, a SAN (storage area network) or a LAN (local area network)) 522 so as to be able to communicate with the storage systems 551.

The storage management system 110 is a management system for the storage systems 551. The storage management system 110 includes an individual management system 110P that manages some of the plurality of storage systems 551 and an overall management system 110W that can communicate with the individual management system 110P and that manages the plurality of storage systems 551 as a whole. The storage management system 110 is coupled to the storage systems 551 via a communication network (for example, a LAN, a WAN (world area network) or the Internet) 521 so as to be able to communicate with the storage systems 551. The communication network 521 may be the same as or different from the communication network 522.

The host management system 120 is a management system for the hosts 553. One or more host management systems 120 are present for the plurality of hosts 553. One of the host management systems 120 may manage some hosts 553 of the plurality of hosts 553. The host management systems 120 are coupled to the hosts 553 via a communication network (for example, a LAN (local area network)) 523 so as to be able to communicate with the hosts 553. The communication network 523 may be the same as either of the communication networks 521 and 522 or different from both the communication networks 521 and 522. For example, at least the overall management system 110W may be able to communicate with each host management system 120 via at least one communication network.

In the present embodiment, the "user" refers to at least an overall manager included in a group of storage managers (overall manager and individual manager) and a host manager. The overall manager is a manger that uses the overall management system 110W and manages all of the plurality of storage systems 551. The individual manager is a manager that uses the individual management system 110P and manages some storage systems 551 of the plurality of storage systems 551. The overall manager may input information on a project (for example, performs an operation for the common configuration and an operation for creating a plurality of jobs), and the individual manager managing source storage system corresponding to the project performs execution operations for the created plurality of jobs at desired timings. Thus, the manager involved in project creation and the manager involved in job execution may be different from each other but may be the same manager. The host manager is a manager that uses the host management system 120 and manages the hosts 553. The host manager, for example, performs configuration for changing an I/O path (a path between the host 553 and the storage system 551 and via which I/O requests are transmitted) with respect to path management programs in the hosts 553. As described above, the present embodiment involves the managers that play different roles and that may be collectively referred to as "users". At least one of the individual manager and the host manager may be absent.

<Specific Configuration of a Part of the Information Processing System>

Figure 3:
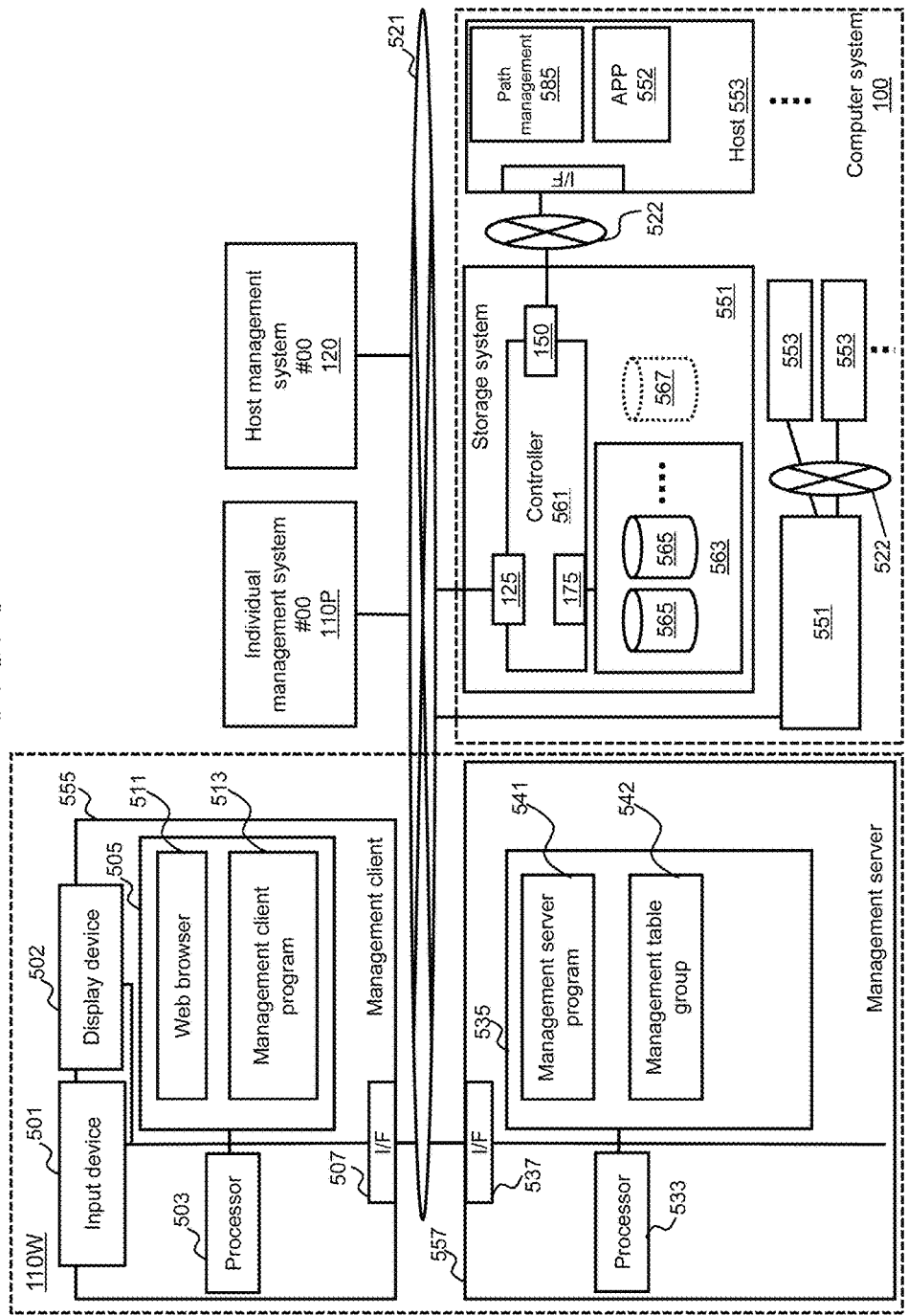
FIG. 3 is a diagram depicting a specific configuration of a part of the information processing system according to the embodiment.

FIG. 3 depicts a specific configuration of a part of the information processing system according to the present embodiment.

The computer system 100 includes one or more hosts 553 and one or more storage systems 551 coupled to the one or more hosts 553. The hosts 553 are coupled to the storage system 551 via the communication network 522.

The storage system 551 has a PDEV group 563 and a controller 561 coupled to the PDEV group 563, and has a plurality of VOLs. The PDEV group 563 has one or more PGs (parity groups). The VOLs include, for example, RVOLs (real VOLs) 565 and VVOLs (virtual VOLs) 567.

The controller 561 has a plurality of devices, for example, a plurality of ports (for example, a back end port 175 for communication with the PDEVs, an external connection port 125, and an I/O port 150), an MPB (a blade (circuit board) with one or more microprocessors (MPs)) and a cache memory. For example, the I/O port 150 receives an I/O request (a write command or a read command) from the host 553, and the MP provided in the MPB controls I/O of data in accordance with the I/O request. Specifically, for example, the MP identifies the VOL of an I/O target from the received I/O request and performs data I/O on the identified VOL. The data for which I/O is performed on the VOL is temporarily stored in the cache memory. When the storage system 551 is a replace source, the controller 561 may, for example, migrate data from a source VOL (the VOL of the migration source) to a target VOL (the VOL of the migration target, provided in the source storage system) via an external path or receive a data I/O request from the source storage system through the external path and performs I/O of data in accordance with the I/O request on the source VOL. When the storage system 551 is a replace target, the controller 561 can write data from the source VOL of the source storage system to the target VOL or transfer the I/O request from the host to the source storage system via the external path. A storage resource (for example, a memory) of the controller 561 can store a group of management tables (one or more tables) including information on a configuration of the storage system 551. The group of management tables represents a relation between the PG and the PDEV, a relation between the PG and the VOL, the capacity of the PG (for example, a full capacity, a free space, an in-use space), the type of the VOL, the capacity of the VOL (for example, a full capacity, a free space, an in-use space), a correspondence relation between the RG and the resource (PG, pool, VOL, and the like), a correspondence relation between the VOL and the I/O port, a correspondence relation between the I/O port and the host group, a correspondence relation between the I/O port and the VOL (typically an online VOL), and the like.

The host 553 may be a physical computer or a virtual computer. The host 553 has an interface device coupled to the storage system, a storage resource that stores computer programs and the like, and a processor coupled to the interface device and the storage resource to execute the computer programs. The computer programs stored in the storage resource include an application program (APP) 552 and a path management program 585. The APP 552, for example, performs a predetermined operation and transmits an I/O request designating a VOL to the storage system 551. Furthermore, the path management program 585 manages a plurality of I/O paths and selects an I/O path used to transmit the I/O request.

The overall management system 110W includes a management server 557 and one or more management clients 555 coupled to the management server 557. The management server 557 coupled to the management clients 555 via the communication network 521.

Each of the management clients 555 has an input device 501, a display device 502, a storage resource (for example, a memory) 505, an interface device (hereinafter referred to as an I/F) 507, and a processor (for example, a CPU (central processing unit)) 503 coupled to the input device 501, the display device 502, the storage resource 505, and the interface device 507. The input device 501 is, for example, a pointing device and a keyboard. The display device 502 is, for example, a device having a physical screen on which information is displayed. A touch screen may be adopted in which the input device 501 and the display device 502 are integrated together. The I/F 507 is coupled to the communication network 521, and the management clients 555 can communicate with the management server 557 via the I/F 507. The communication network 521 and the network connecting the host 553 and the storage system 551 are partly or entirely the same.

The storage resource 505 has, for example, at least a main storage device (typically a memory) of the main storage device and an auxiliary storage device. The storage resource 505 can store computer programs that are executed by the processor 503 and information that is used for the processor 503. Specifically, for example, the storage resource 505 stores a Web browser 511 and a management client program 513. The management client program 513 may be an RIA (rich internet application). Specifically, for example, the management client program is a program file that may be downloaded from the management server 557 (or another computer) and stored in the storage resource 505.

The management server 557 has the storage resource 505, the I/F 537, and a processor (for example, a CPU (central processing unit)) 533 coupled to the storage resource 505 and the I/F 537. The I/F 537 is coupled to the communication network 521, and the management server 557 can communicate with the management clients 555 via the I/F 537. The management server 557 can receive commands in accordance with user operations and transmit display information to the management clients 555 via the I/F 537. Thus, the I/F 537 is an example of the Interface device.

The storage resource 505 has, for example, at least a main storage device (typically a memory) of the main storage device and an auxiliary storage device. The storage resource 505 can store computer programs that are executed by the processor 533 and information that is used for the processor 533. Specifically, the storage resource 505 stores a management server program 541 and a management table group 542. The management table group 542 includes information on configurations of a plurality of storage systems and includes, for example, tables depicted in FIGS. 4 to 16. At least part of the information held by the management table group 542 may be collected from at least one storage system 551 by the management server program 541 or acquired by accessing another management system holding information. The management server program 541 receives commands in accordance with user operations from the management clients 555 and transmits display information to the management clients 555.

The management server program 541, the Web browser 511 (or the client's RIA execution environment), and the management client program 513 cooperate in providing a GUI screen display corresponding to a user operation. Examples of the cooperation are as follows. (Cooperation Example 2) is assumed to be adopted in the present embodiment. (Cooperation Example 1) The management server program 541 transmits at least part of the information held by the management table group 542 to the Web browser 511 (or the management client program 513). The Web browser 511 (or the management client program 513) stores the information in the storage resource 505 as temporal information. The Web browser 511 (or the management client program 513) displays information represented by display information based on a command in accordance with a user operation and the temporal information. (Cooperation Example 2) The management server program 541 receives a command in accordance with a user operation for a display screen from the Web browser 511 (or the management client program 513), creates display information for a display object based on the command and the management table group 542, and transmits the display information. The Web browser 511 (or the management client program 513) receives the display information and displays information represented by the display information. In other words, in short, the management server program 541 displays the information. When a user operation for a GUI screen is performed, the Web browser 511 (or the management client program 513) transmits a command in accordance with the user operation to the management server program 541.

The individual management system 110P may be configured similarly to the overall management system 110W. Tables included in the management table group held by the individual management system 110P may be only a part of the management table group held by the overall management system 110W that is related to a management target (for example, one of the RGs) of the individual management system 110P.

To avoid redundant description, control of display is hereinafter assumed to be performed by the management server program 541 of the overall management system 110W.

<Tables Included in the Management Table Group 542>

FIG. 4 depicts a configuration of a storage management table.

The storage management table 402 has information on storage systems and represents correspondence relations between physical storage systems and virtual storage systems. The storage management table 402, for example, has entries for the respective storage systems (physical storage systems and virtual storage systems). Each of the entries has a storage number/name (the identification number and name of each storage system), a type (the type of the storage system (physical or virtual)), and a belonging-ID. The belonging-ID in this case is the identification number of a physical storage system having a virtual storage system. If no such a physical storage system is present, an invalid value (for example, "-" meaning null) is registered as a belonging-ID.

FIG. 5 depicts a configuration of an RG management table.

The RG management table 403 has information on RGs and represents resources held by RGs and correspondence relations between RGs and storage systems. The RG management table 403, for example, has entries for the respective RGs. Each of the entries has an RG number/name (the identification number and name of each RG), a belonging-ID (the ID of the system to which the RG belongs), and resource details. The belonging-ID in this case is the identification number of the physical or virtual storage system having the RG. For physical or virtual storage systems in which no RG is present, the RG number is "-". The resource details are a list of resources held by the RG (or the physical or virtual storage system) (for example, a list of the numbers of the resources).

FIG. 6 depicts a configuration of a VOL management table.

The VOL management table 600 has information on VOLs and represents correspondence relations between VOLs and RGs (or the physical or virtual storage systems). The VOL management table 600, for example, has entries for the respective VOLs. Each of the entries has a VOL number (the identification number of each VOL), full/free (VOL capacity/VOL free space), a type (the type of the VOL), a belonging-ID (the ID of the RG to which the VOL belongs), and a base ID and a status. The type of VOL may be information such as "RVOL", "EVOL", or "TPVOL" and may include information such as "online" or "offline". The belonging-ID may be the ID of the RG having the VOL. The ID of the RG may be only the identification number of the RG or a combination of the identification number of the RG and the identification number of the physical or virtual storage system having the RG. If no RG is present in the physical or virtual storage system and thus the VOL is held by the physical or virtual storage system, the RG ID as a belonging-ID may be the identification number of the physical or virtual storage system. The base ID is the base of the VOL, and the base is, for example, a PG on which the RVOL is based or a pool with which the TPVOL is associated. Therefore, the base ID is the identification number of the PG, the identification number of the pool, or the like. The status of the VOL is, for example, "Normal" or "Error".

FIG. 7 depicts a configuration of a pool management table.

The pool management table 700 has information on pools and represents correspondence relations between the pools and the RGs (or physical or virtual storage systems). The pool management table 700, for example, has entries for the respective pools. Each of the entries has a pool number (the identification number of each pool), a belonging-ID (the ID of the RG to which the pool belongs), and a pool VOL list and a status. The belonging-ID may be the ID of the RG having the pool. The pool VOL list is a list of the identification numbers of pool VOLs included in the pool. The status of the pool is, for example, "Normal" or "Error". If a fault occurs in any of the PGs based on the pool, the status of the pool may be "Error".

FIG. 8 depicts a configuration of a PG management table.

The PG management table 800 has information on PGs and represents correspondence relations between the PGs and the RGs (or physical or virtual storage systems). The PG management table 800, for example, has entries for the respective PGs. Each of the entries has a PG number (the identification number of each PG), a belonging-ID (the ID of the RG to which the PG belongs), a RAID level, a PDEV list (a list of the identification numbers of PDEVs included in the PG), a type (the type of the PDEVs included in the PG), and a capacity (the capacity of the PG) and a status. The belonging-ID may be the ID of the RG having the PG.

FIG. 9 depicts a configuration of a port management table.

The port management table 900 has information on ports and represents correspondence relations between ports and RGs (or physical or virtual storage systems). The port management table 900, for example, has entries for the respective ports. Each of the entries has a port number (the identification number of each port), a belonging-ID (the ID of the system to which the port belongs), an HG list (a list of the identification numbers of HGs (host groups) associated with the port), WWN (the world wide name of the port), a name (the name of the port), a LUN list (a list of the LUNs (logical unit numbers) of VOLs associated with the port) and a status.

FIG. 10 depicts a configuration of a LUN management table.

The LUN management table 1000 has information on LUNs and represents correspondence relations between LUNs and VOLs. The LUN management table 1000, for example, has entries for the respective LUNs. Each of the entries has a LUN, a VOL number (the identification number of the VOL to which the LUN is allocated), a LUN security (an access attribute associated with the LUN), and an HG number (the identification number of the HG associated with the LUN). The LUN security is, for example, "R/W enabled" (read and write are enabled), "Read Only" (read is enabled but write is disabled), and "R/W disabled" (both read and write are disabled).

FIG. 11 denotes a configuration of an HG management table.

The HG management table 1100 has information on HGs (host groups) and represents correspondence relations between HGs and hosts. The HG management group 1100, for example, has entries for the respective HGs. Each of the entries has an HG number (the identification number of each HG) and a host list (a list of the identification numbers of hosts belonging to the HG).

FIG. 12 depicts a configuration of a pair management table.

The pair management table 1200 has information on pairs of VOLs. The pair management table 1200, for example, has entries for the respective pairs. Each of the entries has a pair number (the identification number of each pair), a primary ID, and secondary ID. The primary ID is a set of the identification number of a primary VOL, and the belonging-ID of the primary VOL (for example, the identification numbers of the RG and the storage system having the primary VOL). The secondary ID is a set of the identification number of a secondary VOL and the belonging-ID of the secondary VOL.

FIG. 13 depicts a configuration of a progress history management table.

The progress history management table 1300 has information on the history of progress. The progress history management table 1300, for example, has entries for each of three types of progress displays "Project", "Job", and "Task". Each of the entries has a progress history for a progress display type corresponding to the entry. The progress history includes one or more sets of a time (for example, a date or a time more specific than the date) and a snapshot progress that is a progress corresponding to the time. The snapshot progress may be, for example, the average of a plurality of progresses corresponding to a plurality of time points included in a predetermined period. The snapshot progress recorded in the entry may be a value that represents the progress itself or a pointer into a table corresponding to the progress (a table held as a snapshot). As the table held as a snapshot, for example, at least one of a project management table, a job management table, and a task management table described below can be adopted. Moreover, other tables such as an RG management table can be adopted.

FIG. 14 depicts a configuration of the project management table.

A project management table 1400 has information on projects and represents correspondence relations between projects and jobs. The project management table 1400, for example, has entries for the respective projects. Each of the entries has a project number, common configuration contents, and a job list/status. The common configuration contents are details of information input (configured) in the common configuration, and represent, for example, an external connection relation that is a correspondence relation between the external connection port of the source storage system and the external connection port of the target storage system and a correspondence relation between a replace source unit for the source storage system and a replace target unit for the target storage system. The replace source unit may be the identification number of the I/O port, the number of the host group associated with the I/O port, and the ID of the RG having the I/O port. The replace target unit may also be the identification number of the I/O port, the number of the host group associated with the I/O port, and the ID of the RG having the I/O port. The correspondence relation between the replace source unit and the replace target unit may be, for example, in units of I/O ports.

The job list/status represents a list of the identification numbers of jobs included in each project and the status of each of the jobs. The status of the job is, for example, as follows.

(A) "Completed": this status means that the job is completed.
(B) "In Progress": this status means that the job is in progress. Specifically, this status means to belong to one of "Running", "Waiting", and "Failed".
(C) "Running": this status means that the job is running.
(D) "Waiting": this status means that the job is waiting for a user operation (for example, the started process has been suspended for a reason other than faults).
(E) "Failed": this status means that the started process has been suspended due to a fault.

The above-described (A) to (E) are the statuses of jobs (or tasks) but are applicable to the status of a resource such as a migration target VOL for the job (or task). Furthermore, another status of resources is "Possible Candidate". "Possible Candidate" means a resource such as a VOL that is present in the storage system but has not been allocated to any job yet. For each of "Completed", "In Progress", "Running", "Waiting", "Failed", and "Possible Candidate", the capacity for each job (or task) can be calculated. Specifically, the VOL allocated to the job (or task) and the status of the job (or task) can be identified using a job management table 1500 or a task management table 1600. Referencing the VOL management table 600 for the identified VOL enables the capacity for the status of the job (or task) (for example, the total amount of the VOL capacity or the total amount of the VOL free space) to be calculated.

FIG. 15 depicts a configuration of a job management table.

A job management table 1500 has information on the jobs and represents correspondence relations among projects, jobs and tasks. The job management table 1500, for example, has entries for the respective jobs. Each of the entries has a job number/name/status (the identification number of each job, and the name and status of the job) and a belonging-ID (the identification number of the project to which the job belongs). Furthermore, each of the entries has, each of a plurality of steps included in the job, a step number (the order of steps), step details (the details of a process executed in each step), a task list (a list of the identification numbers of tasks included in the step), and a status (the status of the step). The step details are determined based on information input during the job creation. In FIG. 15, for example, "(= . . . )" (a bold-italic-faced and underlined representation) is a specific value (substituted into a variable) identified based on input information. An element is uniquely identified from the specific value. For example, one or more alternate I/O paths can be uniquely identified from "(= . . . )" in "alternate I/O paths (= . . . )". Furthermore, for example, a set of a source VOL and a target VOL can be uniquely identified from "(= . . . )" in "VOL migrations (= . . . )".

The status of each job is determined in accordance with a plurality of statuses corresponding to a plurality of steps included in the job. The status of each step is determined in accordance with one or more statuses corresponding to one or more tasks included in the step. Specifically, the statuses are, for example, as follows.

(A) "Completed": this status means that all the tasks belonging to the step are "Completed".
(B) "In Progress": this status means that one of the tasks belonging to the step belongs to one of "Running", "Waiting", and "Failed".
(C) "Running": this status means that one of the tasks belonging to the step is "Running".
(D) "Waiting": this status means that one of the tasks belonging to the step is "Waiting".
(E) "Failed": this status means that one of the tasks belonging to the step has "Failed". The status of the task is set to "Failed" when a fault has occurred in at least one of the resources allocated to the task (the status of the resource has been set to "Error").

As described above, the status of the job is determined, for example, as follows. In the present embodiment, in one job, a plurality of steps is sequentially executed. In one step, one or more tasks are sequentially executed.

(A) "Completed": this status means that all the steps belonging to the job are "Completed".
(B) "In Progress": this status means that one of the steps belonging to the job belongs to one of "Running", "Waiting", and "Failed".
(C) "Running": this status means that one of the steps belonging to the job is "Running".
(D) "Waiting": this status means that one of the steps belonging to the job is "Waiting".
(E) "Failed": this status means that one of the steps belonging to the job has "Failed".

FIG. 16 depicts a configuration of a task management table.

A task management table 1600 has information on the tasks and represents correspondence relations among tasks, jobs and projects. The task management table 1600, for example, has entries for the respective tasks. Each of the entries has a task number (the identification number of each task), a belonging-ID (the ID of the job and project to which the task belongs), task details, and a status (the status of the task). The belonging-ID may be a combination of the order of steps in the system to which the task belongs, the identification number of the job to which the step belongs, and the identification number of the project to which the job belongs. The task details represent at least part of the process corresponding to the step to which the task belongs.

<Replacement Management Screen>

Figure 17:
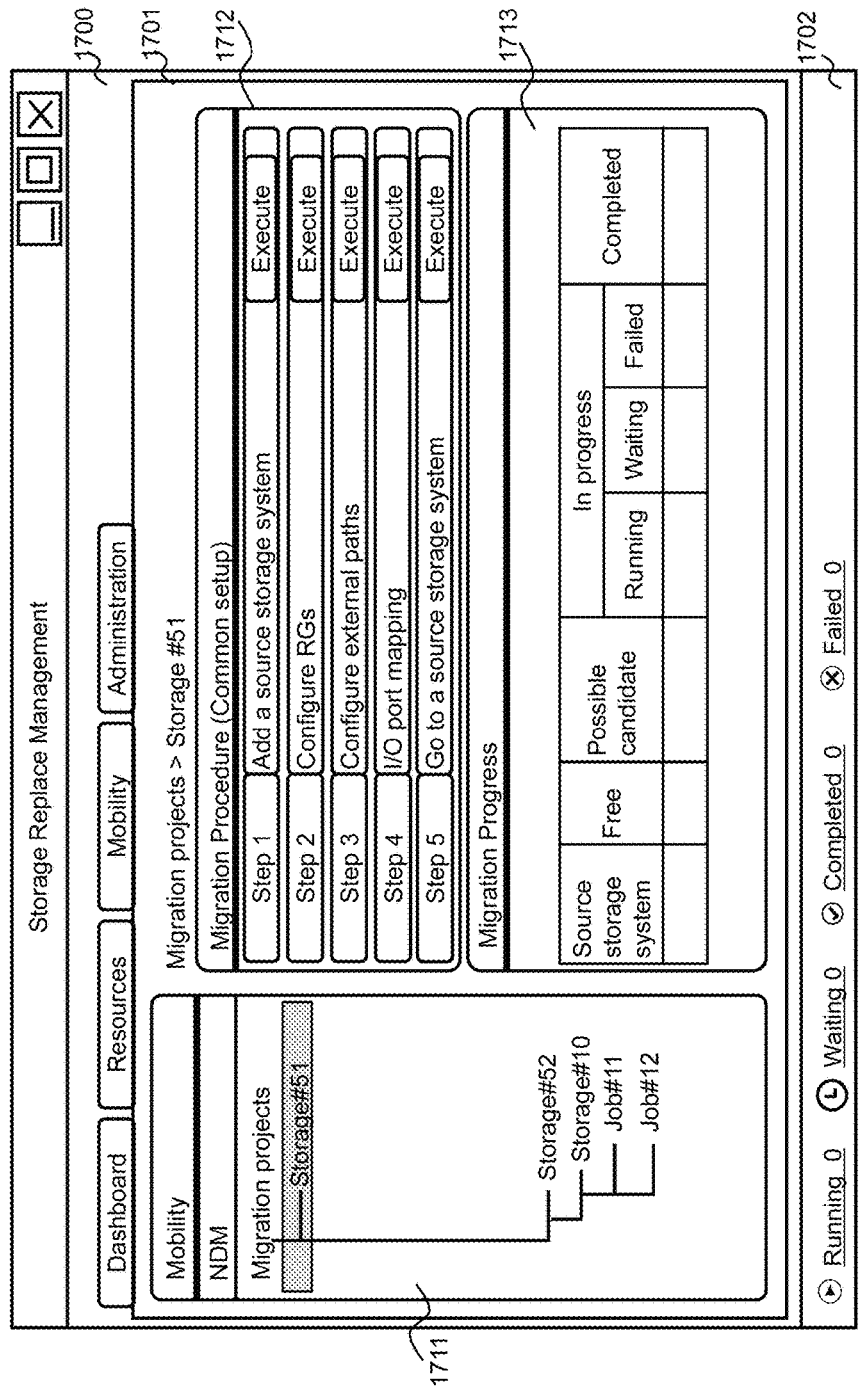
FIG. 17 is a diagram depicting a replace management screen.

FIG. 17 depicts a replace management screen.

A replace management screen 1700 is a screen for management of replacement of storage systems, and is displayed, for example, by the management server program 541 in the overall management system 110W. The replace management screen 1700 has a main screen 1701 and a status bar 1702.

The main screen 1701 has a migration tier view 1711, a first support view 1712, and a second support view 1713. In the present embodiment, the migration tier view 1711 is arranged in the left of the screen 1701, and in the right of the screen 1701, the first support view 1712 and the second support view 1713 are arranged in an up-down direction.

In the migration tier view 1711, the target storage system 551T is displayed on the uppermost tier, and immediately below the target storage system, the source storage system. 551S for the target storage system is displayed. Immediately below the source storage system 551S, the migration job corresponding to the source storage system is displayed. The tier display with the target storage system displayed on the uppermost tier may be displayed for each target storage system. An example in FIG. 17 illustrates that "Storage#51" and "Storage#52" are present as target storage systems and that, for "Storage#52", "Storage#10" is present as a source storage system. The example further illustrates that, for a project corresponding to a set of "Storage#10" and "Storage#52", jobs "Job#11" and "Job#12" are present. Furthermore, for "Storage#51", no source storage system has been present yet. For replacement of storage systems, a plurality of source storage systems may be aggregated into one target storage system. Thus, displaying the target storage system on the uppermost tier allows tier relations to be indicated in an easy-to-understand manner. In the present embodiment, the management server program 541 discovers a plurality of storage systems 551 coupled to the communication network 521 and displays a list of the identification numbers, names, or the like of the discovered storage systems 551. Then, by accepting a selection through a user operation, the management server program 541 can recognize whether the storage system 551 is a source storage system, a target storage system, or an unselected storage system.

The first support view 1712 is a display of a guide for an operating procedure or a first type of progress display (for example, a progress display using graphs). In the example in FIG. 17, the first support view 1712 is a display of a guide for operations for the common configuration.

The second support view 1713 is a second type of progress display (for example, a progress display using tables). The second type of progress display may be the details of the first type of progress display or a progress display based on a viewpoint different from the viewpoint of the first type of progress display. That is, the first type of progress display may indicate an outline of the overall progress of a plan, a project, or a job. The second type of progress display may indicate the details of the outline indicated by the first type of progress display (in FIG. 17, no values are indicated in a table used for the second type of progress display, but the values in this table will be described below in detail).

A status bar 1702 extends in the horizontal direction in the lowermost portion of the screen 1700. The status bar 1702 displays a job status, a step status, or a task status, and a numerical value indicative of the number of operations (or the capacity) belonging to the status. The "number of operations" is the number of jobs, steps, or tasks. Whether the number of jobs, steps, or tasks is displayed may be switched by the user or determined in accordance with a display level (plan, project, or job) corresponding to the first type of progress display. For example, if the display level corresponding to the first type of progress display is project, the number of operations for each status may be the number of jobs. Given that the display level corresponding to the first type of progress display is job, the number of operations for each status may be the number of steps or tasks. The "capacity" is the total capacity of the VOL allocated to the jobs, steps, or tasks belonging to the status. When the VOL is TPVOL, a virtual capacity may be adopted as the capacity of the VOL instead of an actual capacity. The virtual capacity is the capacity of the TPVOL, and the actual capacity is the total capacity of real pages allocated to the TPVOL. Of course, the actual capacity may be adopted instead of the virtual capacity. The status bar 1702 may further display the status "In Progress", and the number of operations (or the capacity) may also be indicated for the status.

<Common Configuration>

In the present embodiment, as described above, those of configuration items needed for replacement have been discovered which are common to a plurality of migration jobs (for example, items of information that need to be configured for main cases). An outline of operations and procedures for the common configuration is displayed in the first support view 1712 as depicted in FIG. 17. The outline of operations and procedures for the common configuration are displayed when a predetermined user operation, for example, one of the target storage systems in the migration tier view 1711 is selected. In the example in FIG. 17, the common configuration includes a plurality of steps (hereinafter referred to as configuration steps) including addition of a source storage system, configuration of RGs (RG mapping (S1) in FIG. 1), configuration of external paths (S2 in FIG. 1), I/O port mapping (S3 in FIG. 1), and advance to the job creation. For example, when an execute button displayed for each configuration step in the first support view 1721 is depressed, acceptance of the operation of the configuration step corresponding to the execution button is started by the management server program 541.

Figure 18:
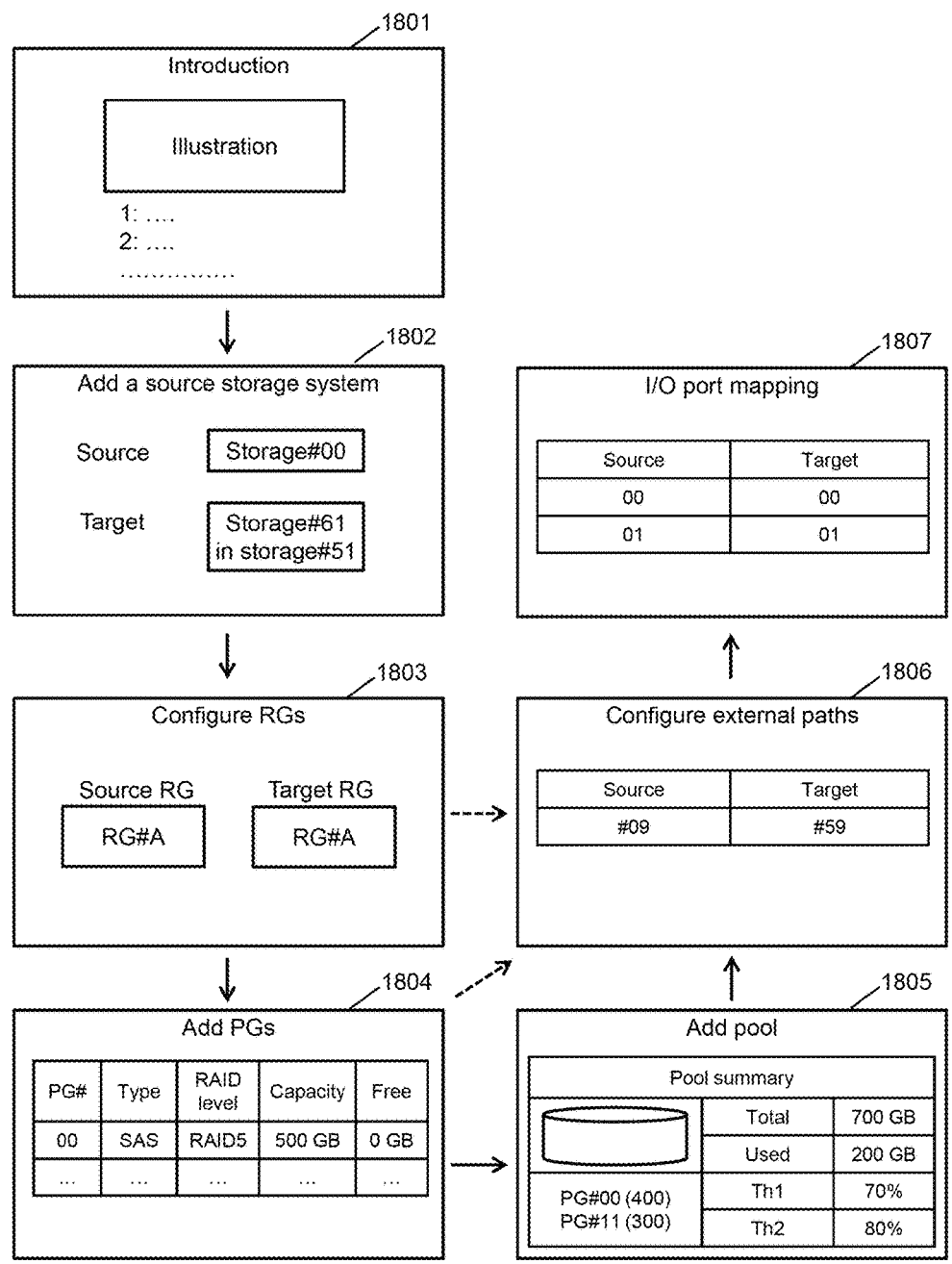
FIG. 18 is a diagram depicting an example of screen transition in accordance with common configuration.
Figure 19:
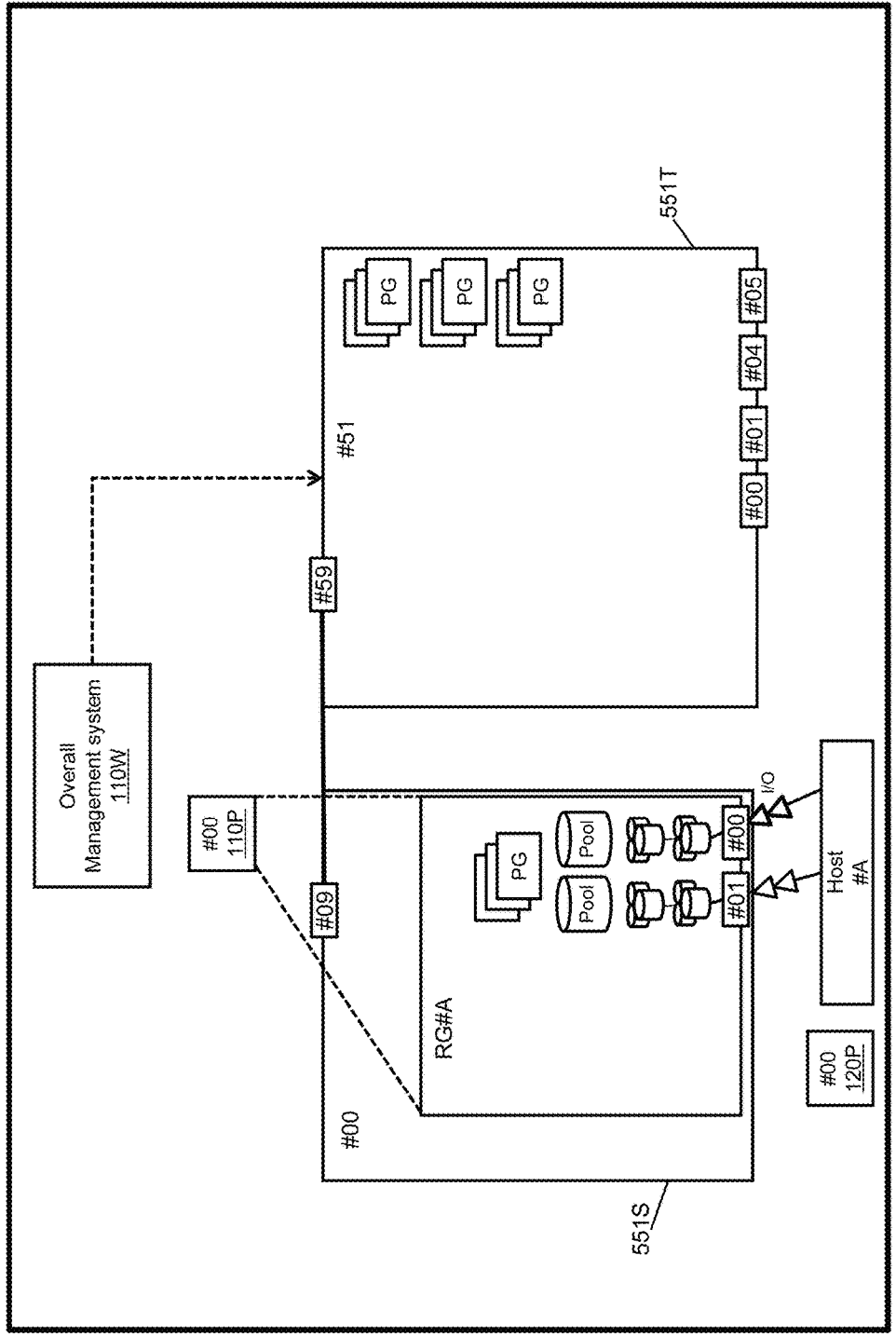
FIG. 19 is a diagram depicting a first part of an outline of a process executed in accordance with the common configuration.
Figure 20:
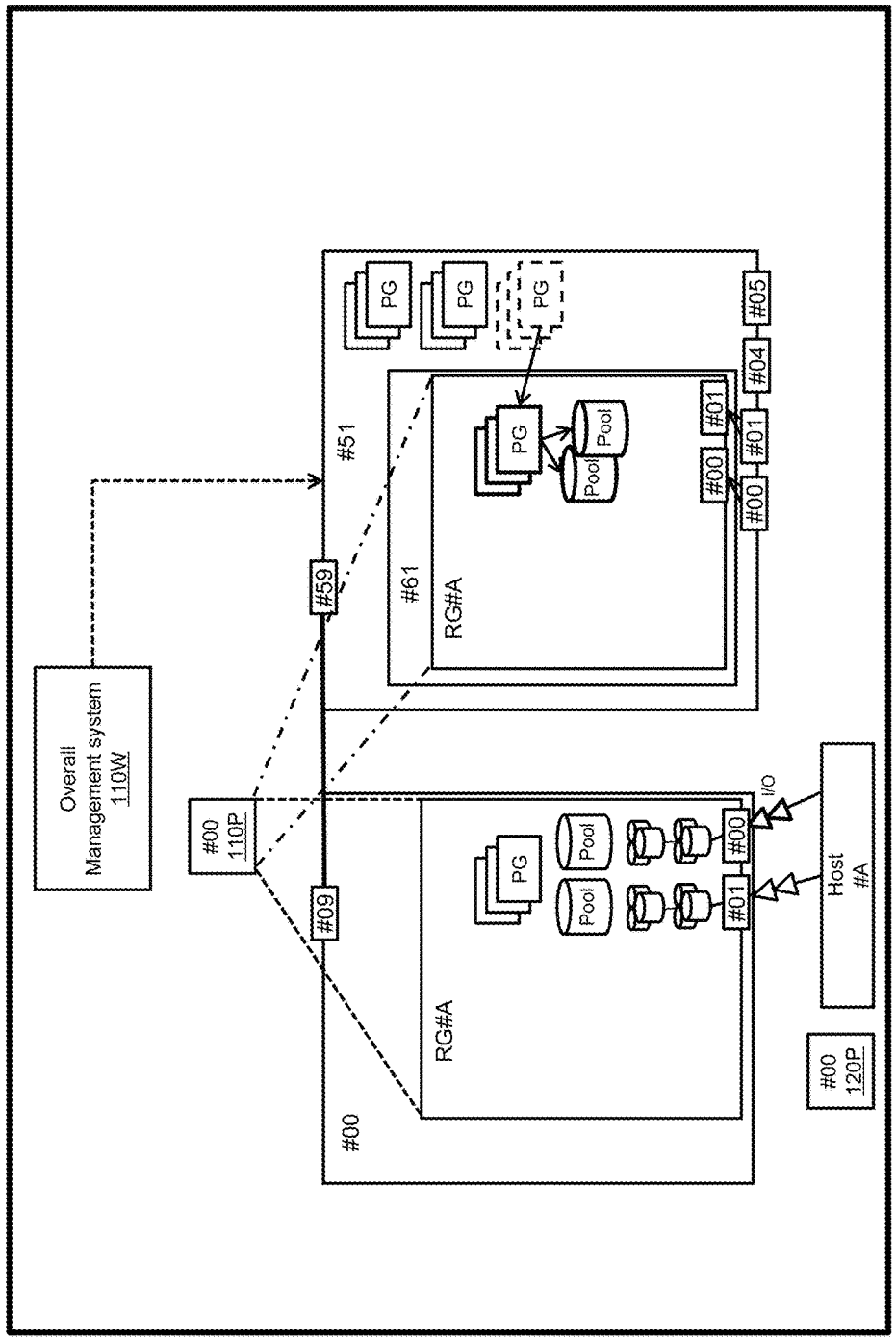
FIG. 20 is a diagram depicting a second part of the outline of the process executed in accordance with the common configuration.

FIG. 18 depicts an example of screen transition for the common configuration. FIG. 19 and FIG. 20 each depict an outline of a process executed in accordance with the common configuration. With reference to FIG. 18 and with reference to FIG. 19 and FIG. 20 as needed, the common configuration will be described. All screens depicted in FIG. 18 are displayed, for example, by the management server program 541 in the overall management system 110W.

When a predetermined user operation is performed, the management server program 541 displays an introduction screen 1801. The introduction screen 1801 displays a description image indicating the common configuration. A plurality of descriptive images may be prepared and switched like a slide. As an example of descriptive image, an image may be adopted which is formed by superimposing FIG. 19 and FIG. 20 on each other. In the descriptive image, portions corresponding to the configuration steps may be associated with the numbers of the configuration steps. Then, the user can visually (using images) understand what operations are performed in accordance with what procedures. Furthermore, the introduction screen 1801 displays description (text) of the configuration steps. The display of the introduction screen 1801 may be skipped.

Then, a source storage system addition screen 1802 is displayed. The identification number of a storage system to be added as a source storage system and the identification number (or name) of a target storage system (virtual storage system) are input to the source storage system addition screen 1802 via user operations. The selected source storage system #00 has RG#A as depicted in FIG. 19. RG#A is managed by an individual management system #00. Furthermore, as depicted in FIG. 19, no virtual storage system is present in a target storage system #51. When the identification number (or name) of a virtual storage system to be created in the target storage system #51 is input via a user operation and execution is indicated, a virtual storage system #61 with the input identification number (or name) is created in the target storage system #51 as depicted in FIG. 20.

Then, an RG configuration screen 1803 is displayed. The RG configuration screen 1803 displays the identification number (or name) of a source RG (an RG of the selected source storage system), and also displays an input section for the identification number (or name) of a target RG (an RG associated with the source RG and created in the target storage system). In the screen 1803, the identification number (or name) of the target RG is input via a user operation. Then, as depicted in FIG. 20, a target RG#A with the input identification number (or name) is created in the virtual storage system #61. The target RG#A is a target to be managed by the individual management system #00 managing a source RG#A corresponding to the target RG#A. For example, the overall management system 110W notifies the individual management system 110P managing the source RG#A of information on the target RG#A to allow the individual management system 110P to recognize and subsequently manage the target RG#A.

Furthermore, when a predetermined user operation is performed on the RG configuration screen 1803, the management server program 541 accepts the designation of a resource allocated to the target RG from the user. For example, the management server program 541 may display a list of PGs and pools in the target storage system #51 that can be allocated, based on the RG management table 403 (see FIG. 5), so as to accept selection of a PG or a pool to be allocated to the target RG#A. Specifically, for example, the management server program 541 may display a PG addition screen 1804 and accept a PG to be added to the target RG#A via the PG addition screen 1804. The management server program 541 may further display a pool addition screen 1805 and accept a pool based on the added PG via the pool addition screen 1805. When no pool needs to be added, the display of the pool addition screen 1805 may be skipped as depicted by a dashed line arrow. As an alternative method, the management server program 541 may identify the PG or pool to be allocated to the source RG#A using the RG management table 403, and allocate the same PG or pool as the identified PG or pool (or an alternative PG or pool) to the target RG#A. In this case, the display of the PG addition screen 1804 and the display of the pool addition screen 1805 may be skipped as depicted by a dashed line. As depicted in FIG. 20, the PG and the pool are allocated to the target RG#A so that the target RG#A is configured similarly to the source RG#A.

An external-path configuration screen 1806 is displayed. The identification number (or name) of a source external connection port (the external connection port of the source storage system) and the identification number (or name) of a target external connection port (the external connection port of the target storage system) are input to the external-path configuration screen 1806 via a user operation. Consequently, as depicted in FIG. 20, a source external connection port #09 and a target external connection port #59 are associated with each other, and an external path is set. Two or more sets of a source external connection port and a target external connection port may be input to the screen 1806, and thus, two or more external paths may be set for a set of one source storage system and one target storage system. Furthermore, when two or more external paths are set, a priority may be given to each of the two or more external paths via a user operation.

Finally, an I/O port mapping screen 1807 is displayed. The identification number (or name) of a source I/O port (the I/O port of the source storage system) and the identification number (or name) of a target I/O port (the I/O port of the target storage system) are input to the I/O port mapping screen 1807 via a user operation. Consequently, as depicted in FIG. 20, target I/O paths #00 to #01 are each allocated to the target RG#A and associated with source I/O ports #00 to #01.

Figure 21:
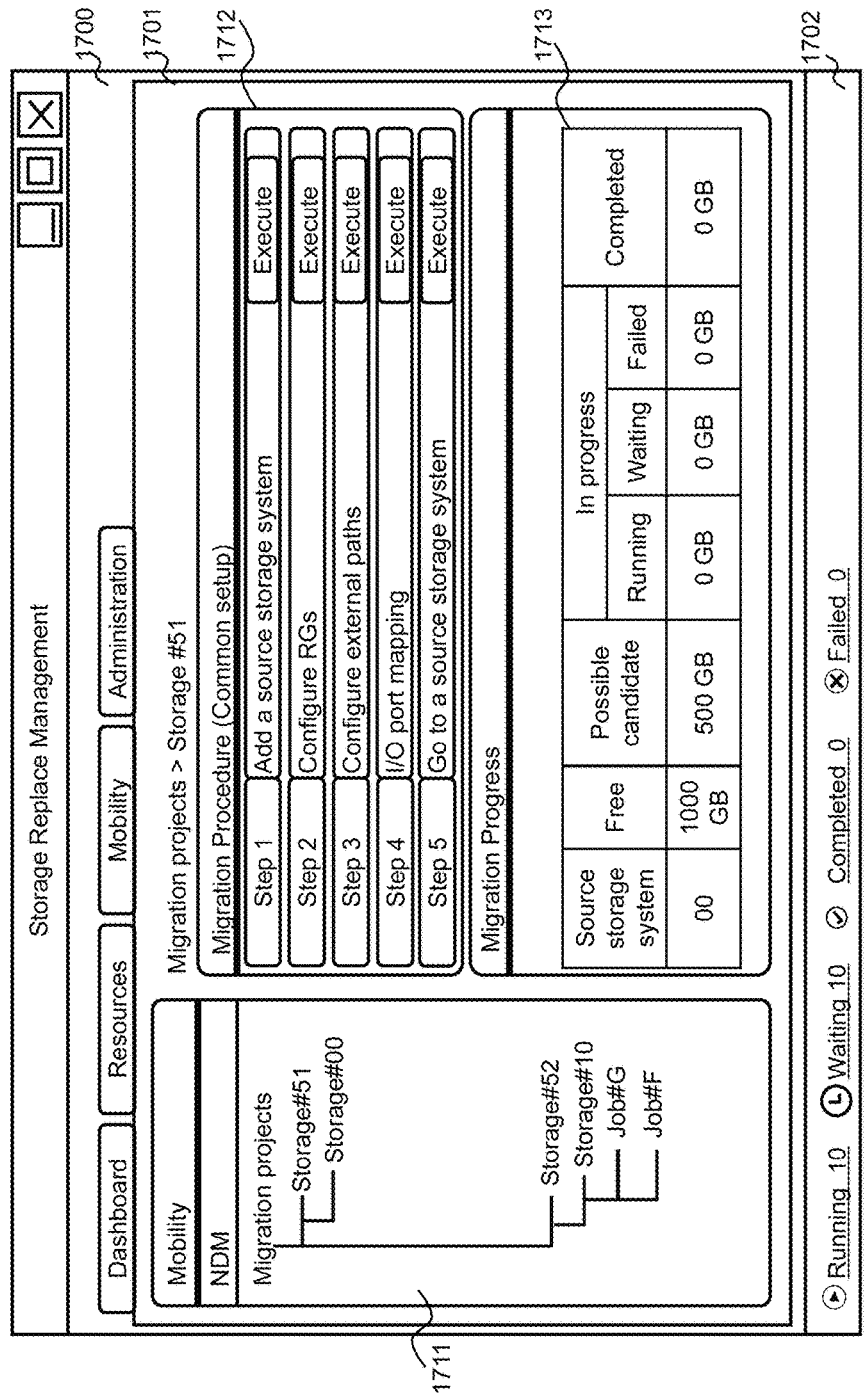
FIG. 21 is a diagram depicting an example of the replace management screen resulting from completion of the common configuration.

The results of the above-described common configuration are reflected in the replace management screen 1700 as depicted in FIG. 21.

Specifically, for example, in the migration tier view 1711, "Storage#00" is additionally provided immediately below "Storage#51" by the management server program 541. Furthermore, a record corresponding to the source storage system #00 is added to the second support view 1713 (table) by the management server program 541. In the record, numerical values are recorded for the respective statuses by the management server program 541. A value corresponding to "Possible Candidate" is the total capacity of the VOL that can be allocated to jobs (tasks) in the source storage system #00. Numerical values corresponding to "Completed" and "In Progress" ("Running", "Waiting", and "Failed") are indicative of the total capacity of the VOL related to the jobs (tasks) corresponding to the status. The numerical value corresponding to each status may be the number of jobs (or tasks) corresponding to the status instead of the capacity.

<Job Creation>

After the common configuration is completed, the job creation is enabled. For example, when a predetermined user operation such as depression of an execute button for "Go to a source storage system" in the first support view in the screen 1700 in FIG. 21, a job creation screen is displayed.

FIG. 22 depicts a job creation screen.

A job creation screen 2200 is a screen for the job creation displayed, for example, by the management server program 541 in the overall management system 110W. The job creation screen 2200 displays a job definition condition selection 2202 and a selected source VOL list 2203.

The job definition condition selection 2202 is a tool (including, for example, a radio button) that accepts a selection of a job definition condition. Available job definition conditions are "Hosts" and "Manual".

When the job definition condition "Hosts" is selected, the management server program 541 accepts an input of a designation of one or more hosts desired by the user and an input of a designation of a host unit. In the example in FIG. 22, "Host#A" is input via a user operation. However, two or more hosts such as "Host#A, Host#B" may be designated. The management server program 541 selects all the VOLs accessed by the host identified in accordance with the job definition condition "Hosts", from a VOL set held by the source storage system, as source VOLs. The management server program 541 adds information on the selected source VOLs to the selected source VOL list 2203 (specifically, registers the information in an information storage area in a storage resource 535 that is indicated as the selected source VOL list 2203).

When the job definition condition "Manual" is selected, a selection of the source VOLs is accepted by the management server program 541. The management server program 541 adds the source VOLs selected by the user operation to the selected source VOL list 2203.

The selected source VOL list 2203 is a list of information on the source VOLs. Items of information on the source VOLs include, for example, VOL numbers, host numbers (the identification numbers of hosts accessing the VOLs), and WWNs (WWNs of ports to which the VOLs are allocated). Values for the items are identified using the VOL management table 600, the port management table 900, the LUN management table 1000, and the HG management table 1100.

When a predetermined user operation is performed (for example, a "Submit" button is depressed) in the screen 2200, the management server program 541 creates one job for all the source VOLs represented in the selected source VOL list 2203. In other words, one or more source VOLs are present for one job. The details of the created job (the details of the step) are registered in the job management table 1500 as described above. Specifically, for example, a template for a job is prepared and may have variables for the respective steps of the job. The variables may include those into which the identification numbers of storage systems, the identification numbers of ports, the identification numbers of VOLs, and the like are substituted. The job may be created by inputting appropriate values to the variables in the job template. In job details in FIG. 15, bold-italic-faced and underlined representations may be substituted into the variables.

As described above, source VOLs for one job can be designated in terms of hosts. The effects of determination of source VOLs for one job in terms of hosts will be described below.

In the job creation, the management server program 541 avoids duplicate selection of source VOLs. Specifically, the management server program 541 registers VOLs selected for created jobs by, for example, setting flags in the table, and in creating a job in accordance with the job definition condition, selects VOLs other than the selected VOLs as source VOLs. That is, the management server program 541 avoids duplicate selection of selected VOLs as source VOLs.

The job creation is performed between the common configuration and the job execution. However, both the job creation and the job execution may be carried out for each job or collectively carried out for two or more jobs. Alternatively, after all jobs that can be created by the job creation are created, the job execution may be carried out for each job.

<Job Execution>

Figure 23:
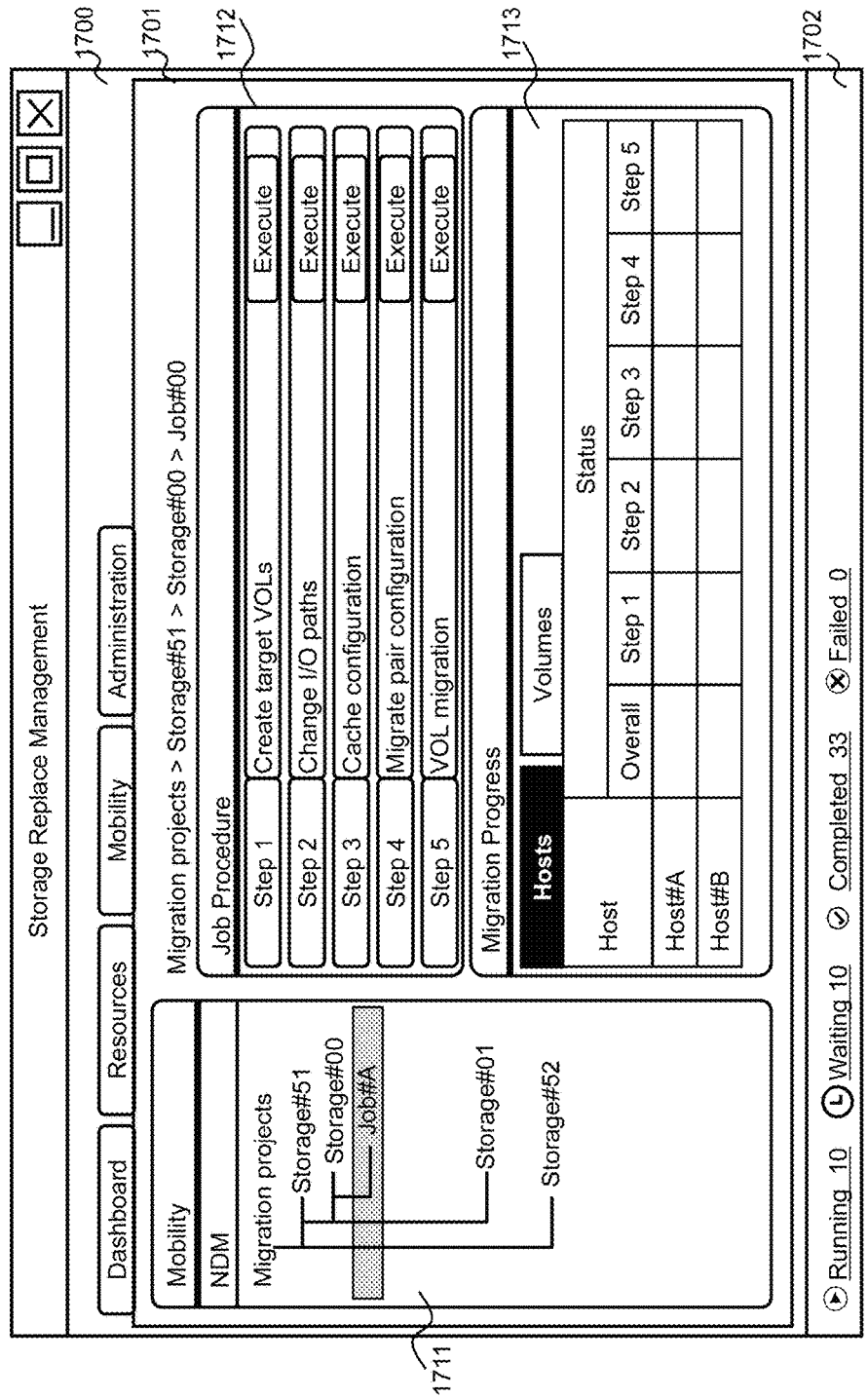
FIG. 23 is a diagram depicting an example of the replace management screen resulting from completion of job creation.

When a job is created, the created job (for example, "Job#00") is added to the migration tier view 1711 as depicted in FIG. 23. When the job is selected, a guide for job execution is displayed in the first support view 1712. The first support view 1712 has operation description and an execute button for each step of the job. When the execute button is depressed, acceptance of operation (operation for job execution) of the step corresponding to the execute button is started by the management server program 541.

The steps included in the job are, for example, as follows.

Figure 26:
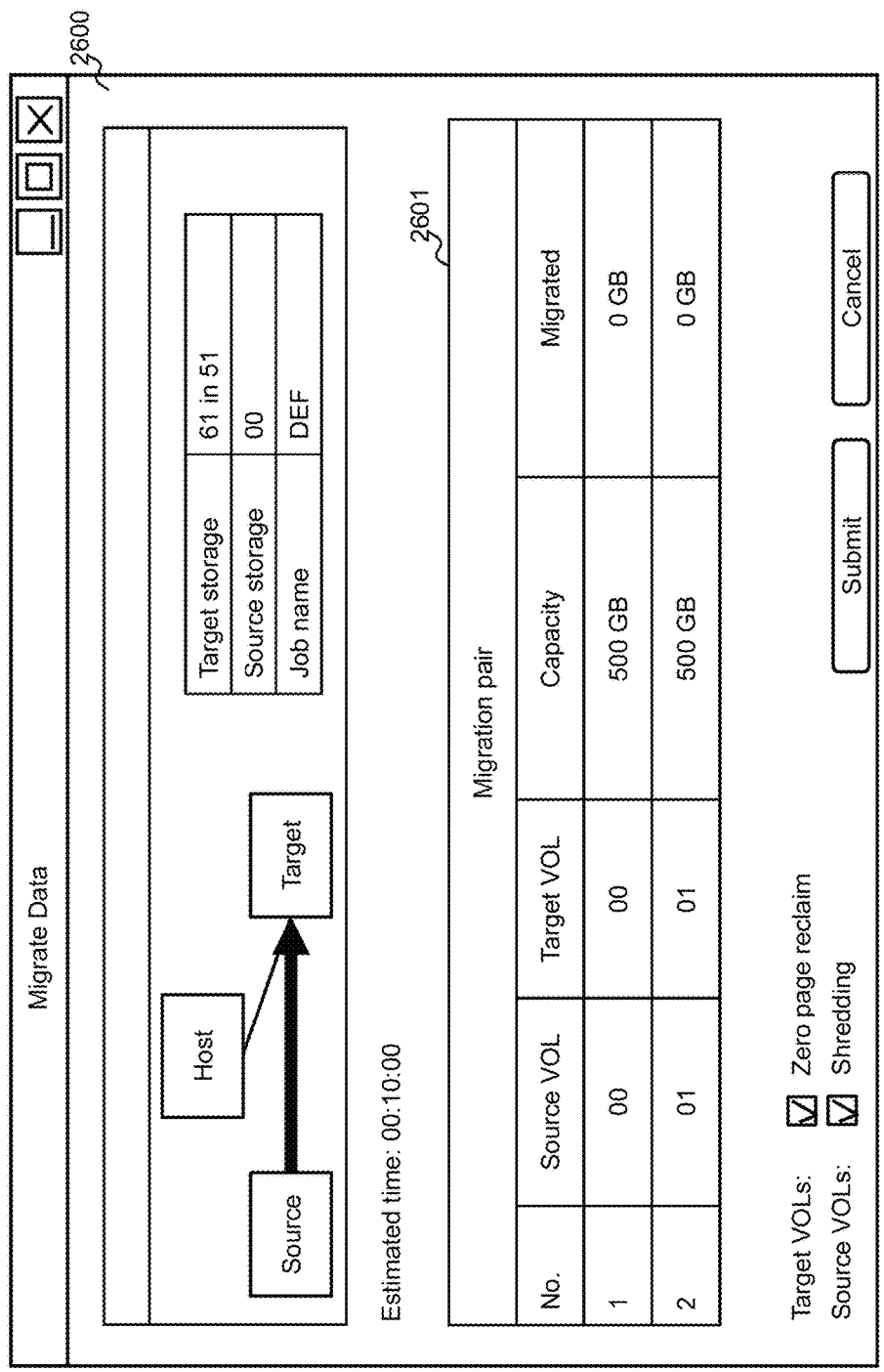
FIG. 26 is a diagram depicting a VOL migration screen.

Step 1: create target VOLs
Step 2: change I/O paths
Step 3: cache configuration
Step 4: Pair reconfiguration
Step 5: VOL migration The job execution will be described below with reference to FIG. 24 to FIG. 29. FIG. 24 to FIG. 26 are screens displayed by the management server program 541, and FIG. 27 and FIG. 28 each depict an outline of a process carried out by the job execution. With reference to FIG. 24 to FIG. 26 and with reference to FIG. 27 to FIG. 28 as needed, the job execution will be described.

<<Step 1: Create Target VOLs>>

In response to the start of step 1, the management server program 541 updates the status of step 1 to "Running". The management server program 541 displays a target VOL creation screen.

FIG. 24 depicts the target VOL creation screen.

Based on the project management table 1400 and the job management table 1500, a target VOL creation screen 2400 displays information 2401 on external paths configured in the common configuration (external-path configuration), information 2402 on alternate I/O paths configured in the common configuration (I/O port mapping), and information 2403 on original I/O paths corresponding to alternate I/O paths. The information on alternate I/O paths is information on target I/O ports configured in the I/O port mapping. The information on original I/O paths is information on source I/O ports corresponding to the configured target I/O ports.

The displayed original I/O paths are I/O paths routed via source I/O ports with which source VOLs belonging to the running job are associated. The displayed alternate I/O paths are I/O paths routed via target I/O ports corresponding to the source I/O ports. The source VOLs belonging to the running job are identified using the job management table 1500.

Figure 27:
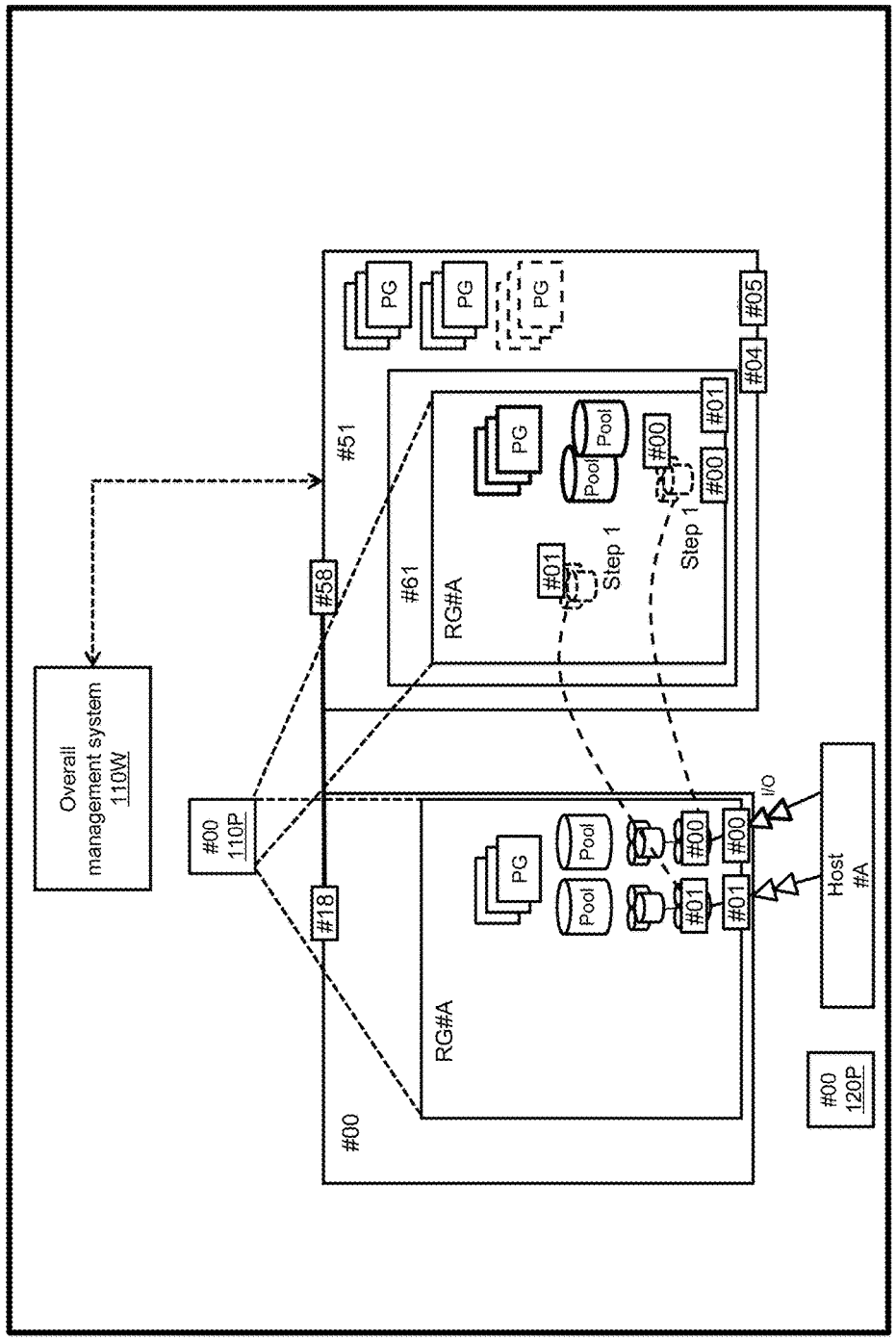
FIG. 27 is a diagram depicting a first part of an outline of a process performed by job execution.

When the information on external paths, the information on alternate I/O paths, and the information on original I/O paths are all correct, the user performs a user operation for proceeding to the next step (for example, depressing a "Submit" button). Then, as depicted in FIG. 27, the management server program 541 transmits an indication to create target VOLs #00 and #01 corresponding to source VOLs #00 and #01 to the target storage system #51 (or the individual management system #00 for the target storage system #51). As a result, as depicted in FIG. 27, the target VOLs #00 and #01 are created in the target storage system #51 (virtual storage system #61), and the created target VOLs #00 and #01 are associated with the respective alternate I/O paths (target I/O paths #00 and #01). The created target VOLs #00 and #01 are virtual VOLs, and are physically source VOLs #00 and #01. Thus, when the target storage system #51 receives an I/O request designating one of the target VOLs #00 and #01, the I/O request is transferred to the source storage system #00.

When the target storage system. #51 creates and associates target VOLs #00 and #01 with the target I/O ports #00 and #01, the management server program 541 receives a completion response from the target storage system #51 (or the individual management system #00 for the target storage system #51). In response, the management server program 541 updates the status of step 1 to "Complete". Even when step 1 is completed ("Completed"), the host #A is not allowed to issue any I/O request via an alternate I/O path.

If, during execution of step 1, a fault (error) is detected in any resource and involvement of the resource in step 1 is determined using a table having information on the resource in which the error has occurred and the job management table 1500, the management server program 541 updates the status of step 1 to "Failed". Alternatively, if, during execution of step 1, any task belonging to step 1 is suspended via a user operation or the like, the management server program 541 updates the status of step 1 to "Waiting". Both "Failed" and "Waiting" mean suspension of step 1, specifically, suspension of execution of the job to which step 1 belongs. Therefore, when step 1 (any task belonging to step 1) is changed to "Failed", the job to which step 1 belongs is also changed to "Failed". When step 1 (any task belonging to step 1) is changed to "Waiting", the job to which step 1 belongs is also changed to "Waiting". The description in this paragraph is applied to the other steps belonging to the job. Thus, to avoid redundancy of description, description of examples in which other steps are changed to "Failed" and "Waiting" is omitted.

The process executed in step 1 has been described. However, step 1 is a set of one or more tasks, and when all of the one or more tasks are each "Completed", step 1 is "Completed". The description in this paragraph is also applied to the other steps belonging to the job.

<<Step 2: Change I/O Paths>>

In response to the start of step 2, the management server program 541 updates the status of step 2 to "Running". The management server program 541 displays an I/O path change screen.

FIG. 25 depicts the I/O path change screen.

An I/O path change screen 2500 displays information 2501 on alternate I/O paths, and a first execute button 2502 for outputting an alternate-path file (a file describing information needed to configure an alternate I/O path for the host and set the alternate I/O path to an online state). Furthermore, the I/O path change screen 2500 displays information 2503 on original I/O paths, and a second execute button 2504 for outputting an original-path file (a file describing information needed to configure the host to change each original I/O path from online state to offline state). Both the alternate-path file and the original-path file are, for example, in a CSV format. However, the format of the file need not be limited to CSV.

Figure 28:
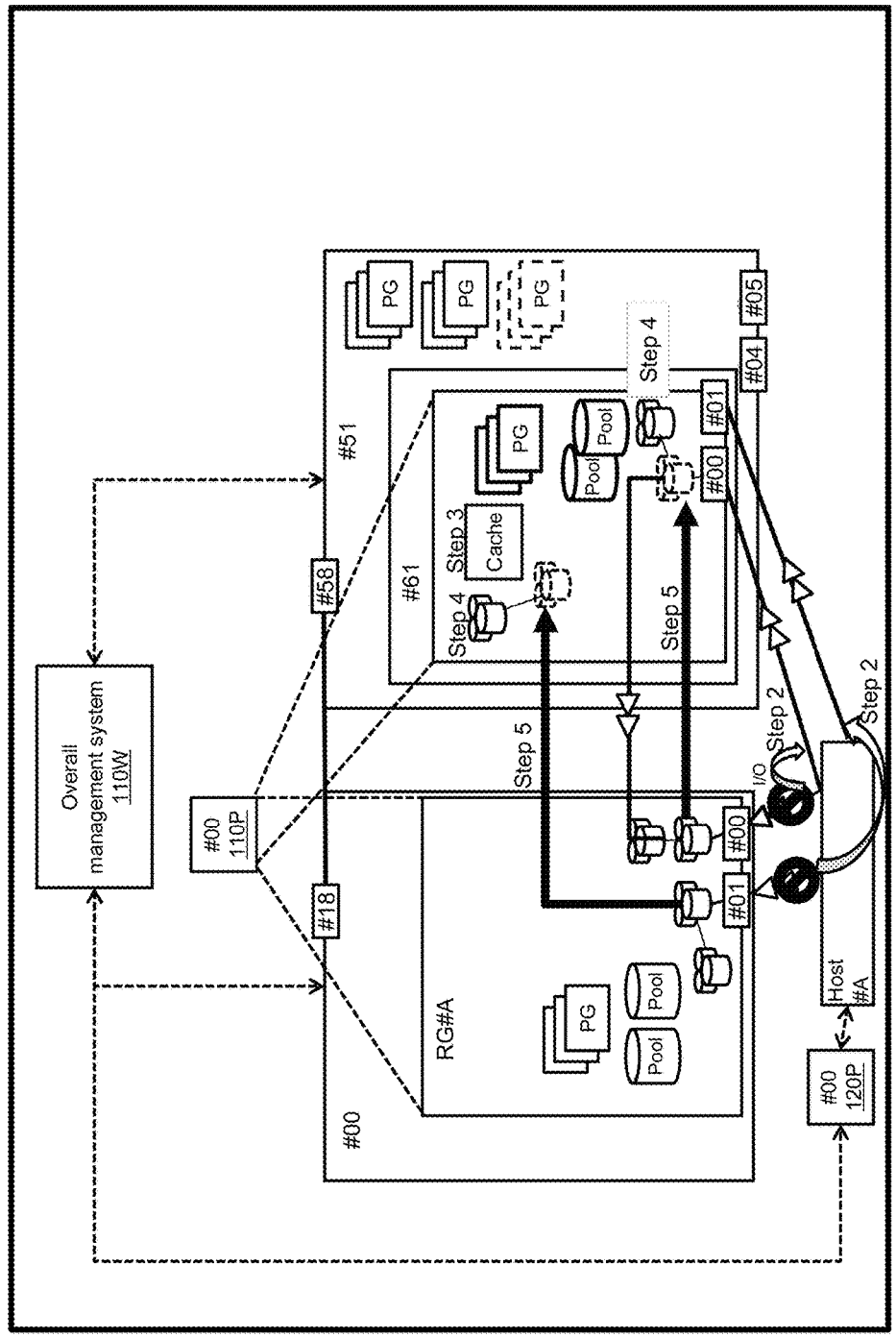
FIG. 28 is a diagram depicting a second part of the outline of the process performed by the job execution.

If the first execute button 2502 is depressed, then as depicted in FIG. 28, the management server program 541 creates alternate-path files for all the alternate I/O paths displayed on the I/O path change screen 2500 and transmits the created alternate-path files to, for example, a host management system #00 for the host #A. A host administrator (an operator of the host management system #00) configures information on the alternate I/O paths for the path management program of the host #A based on the alternate-path files and sets the alternate I/O paths to the online state. Consequently, the host #A is enabled to transmit I/O requests via any of the alternate I/O paths. When making the alternate I/O paths online is completed, the management server program 541 receives a completion response from the host management system #00. Then, the task for the alternate I/O paths is completed ("Completed").

If the second execute button 2504 is depressed, then as depicted in FIG. 28, the management server program 541 creates original-path files for all the original I/O paths displayed on the I/O path change screen 2500 and transmits the created original-path files to, for example, the host management system #00 for the host #A. The host administrator (the operator of the host management system #00) sets the original I/O paths to the offline state for the path management program of the host #A based on the original-path files. Consequently, the host #A is disabled to transmit I/O requests via any of the original I/O paths. When making the original I/O paths offline is completed, the management server program 541 receives a completion response from the host management system #00. Then, the task for the original I/O paths is completed ("Completed").

The alternate-path file is created for all the target VOLs belonging to the job. The original-path file is created for all the source VOLs belonging to the job. In other words, the I/O path change is carried out for all the source VOLs and all the target VOLs belonging to the job. Thus, if the above-described job definition condition is designated by the host, the I/O path change may be carried out for all the source VOLs used by the designated host. When the same host involves many I/O path changes, it is expected that duplicate operations are needed for the same host and that more communication is needed between a storage manager and a host manager, leading to increased burdens on the storage and host managers. However, such burdens can be reduced because the I/O path change can be collectively performed for all the source VOLs used by the designated host.

After step 2 is completed ("Completed"), step 3 can be started.

Techniques for virtualization of storage systems are disclosed in, for example, Japanese Patent Application Laid-open No. 2008-040571 and Japanese Patent Application Laid-open No. 2007-286946. The techniques may be utilized for the I/O path change in the present embodiment. For example, the path management program of the host #A can be made to recognize that the target I/O port is an I/O port present in the source storage system by notifying the host #A, through the target I/O port, of the number of the source storage system and the number of the target VOL (the same number as the number of the source VOL).

When step 2 is completed, the host #A transmits an I/O request via an alternate I/O path. However, the target VOL has no data, and thus, the target storage system #51 performs data I/O in accordance with the received I/O request (the I/O request designating the target VOL) on the source VOL via the external path. Specifically, the target storage system #51 transfers the received I/O request to the source storage system #00 via the external path, and the source storage system #00 performs the data I/O on the source VOL in accordance with the received I/O request.

Furthermore, when step 2 is completed, a cache for the target VOL in the target storage system #51 has been disabled. Therefore, the data in accordance with the I/O request designating the target VOL is not temporarily stored in the cache memory in the target storage system #51. In other words, the target storage system #51 does not perform caching for the target VOL until the target storage system #51 receives an indication to enable the cache for the target VOL.

<<Step 3: Cache Configuration>>

In response to the start of step 3, the management server program 541 updates the status of step 3 to "Running". The management server program 541 displays a cache configuration screen (not depicted in the drawings). The management server program 541 accepts an indication to perform caching for the target VOL via the cache configuration screen, and transmits the indication to the target storage system #51 (or the individual management system #00 for the target storage system #51). Consequently, as depicted in FIG. 28, the cache is enabled for the target VOL to allow the target storage system #51 to perform caching for the target VOL.

When the cache is enabled for the target VOL, the management server program 541 receives a completion response from the target storage system #51 (or the individual management system #00 for the target storage system #51). In response, the management server program 541 updates the status of step 3 to "Completed".

<<Step 4: Pair Reconfiguration>>

In response to the start of step 4, the management server program 541 updates the status of step 4 to "Running". The management server program 541 displays a pair reconfiguration screen (not depicted in the drawings). The management server program 541 accepts an indication for pair reconfiguration via the pair reconfiguration screen. The pair reconfiguration refers to, when the source VOL corresponding to the target VOL is a primary VOL, creating, in the target storage system, a secondary VOL similar to a secondary VOL paired with the source VOL and pairing the created secondary VOL with the target VOL. Upon accepting the indication for pair reconfiguration, the management server program 541 transmits the indication for pair reconfiguration to the target storage system #51 (or the individual management system #00 for the target storage system #51). The indication for pair reconfiguration includes the identification number and the capacity of a secondary VOL to be created and the identification number of a target VOL to be used as a primary VOL. Consequently, a pair of the target VOL and the secondary VOL is configured in the target storage system #51 as depicted in FIG. 28.

When the pair reconfiguration is performed, the management server program 541 receives a completion response from the target storage system #51 (or the individual management system #00 for the target storage system #51). In response, the management server program 541 updates the status of step 4 to "Completed".

The migration target is VOLs, and the VOL set in one source storage system is divisionally migrated in accordance with a plurality of jobs. Thus, this concept excludes creation of pairs in the target storage system before job creation and concurrent creation of pairs in the target storage system after all the jobs are completed. Besides, if the job is ended, migration of the VOLs belonging to the job should have been completed (=normal state). Consequently, creation of pairs should have been ended when VOL migration is completed. In the present embodiment, the pair reconfiguration is carried out during the job creation and before the start of the VOL migration. Thus, the pair reconfiguration in accordance with the above-described concept is implemented.

<<Step 5: VOL Migration>>

In response to the start of step 5, the management server program 541 updates the status of step 5 to "Running". The management server program 541 displays a VOL migration screen.

FIG. 26 depicts a VOL migration screen.

A VOL migration screen 2600 displays information 2601 on migration pairs (pairs each of a source VOL and a target VOL). The information on migration pairs is information identified based on the job management table 1500, the project management table 1400, the VOL management table 600, the port management table 900, and the LUN management table 1000. The information on migration pairs includes the identification number of a source VOL and the identification number of a target VOL for each migration pair. The information on migration pairs may further include the capacity of the source VOL and a portion of the capacity that has been migrated.

When a predetermined user operation is performed (for example, the "Submit" button is depressed) for the VOL migration screen 2600, data is migrated from the source VOL to the target VOL for each migration pair as depicted in FIG. 28. Specifically, for example, the management server program 541 transmits an indication to perform VOL migration to at least one of the source storage system #00 and the target storage system #51 (or the individual management system #00 therefor). The indication to perform VOL migration may include information on each migration pair. Then, for each migration pair, data is migrated from the source VOL to the target VOL. For each migration pair, every time migration is completed, the management server program 541 receives a completion response from at least one of the source storage system #00 and the target storage system #51 (or the individual management system #00 therefor). Upon receiving a completion response for all the migration pairs, the management server program 541 updates the status of step 5 to "Completed".

Options may be provided for the job. Options may be prepared for at least one of the target VOL and the source VOL. An option for the target VOL may be, for example, zero page reclaim. The zero page reclaim refers to returning, to a pool, those of the real pages allocated to the target VOL (TPVOL) in which only zero data is described. An option for the source VOL may be, for example, shredding. The shredding refers to repeatedly writing dummy data to the overall VOL so as to preclude the data in the VOL from being restored.

Figure 29:
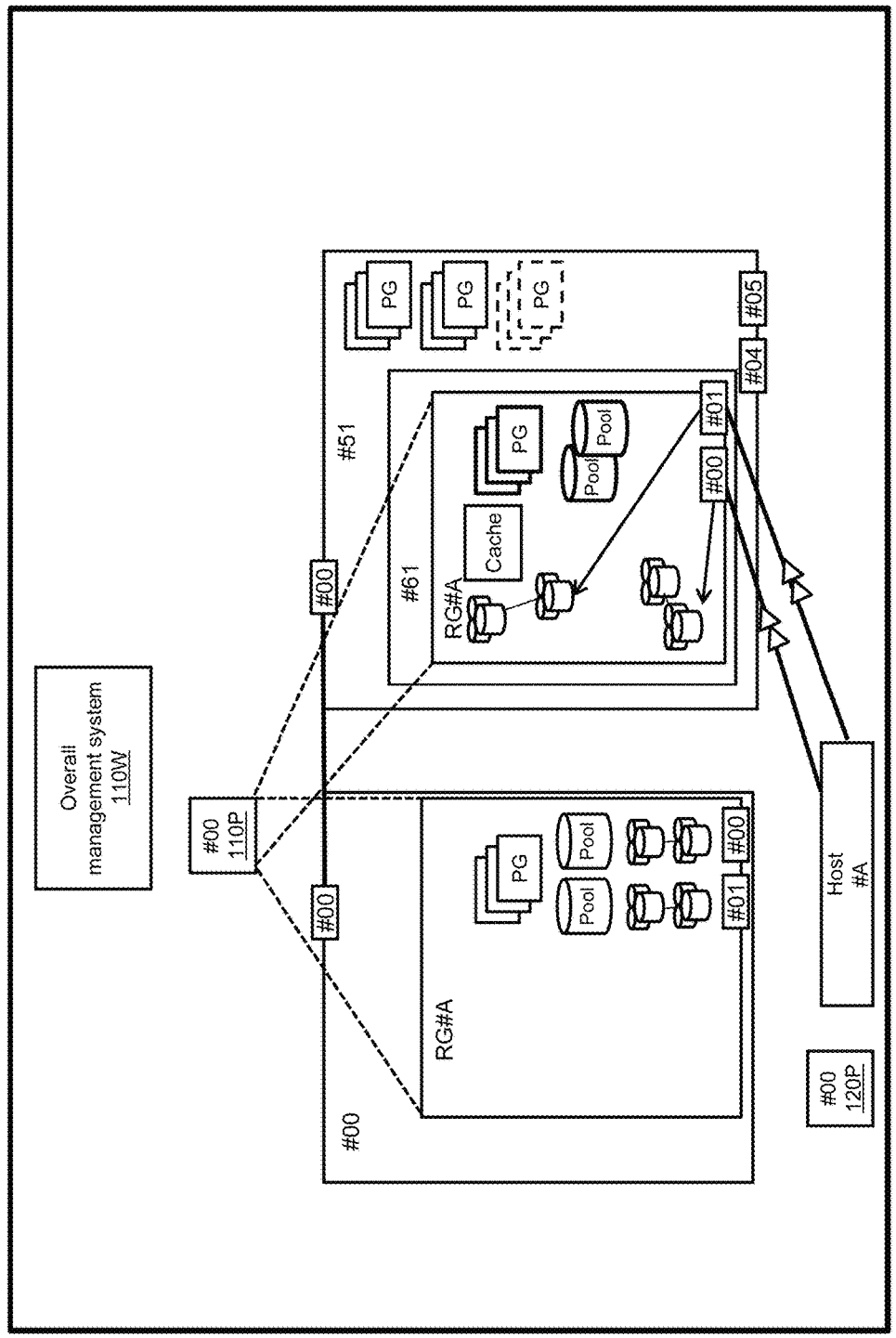
FIG. 29 is a diagram depicting an example of an outline of a state after completion of replacement.

The process executed for one job has been described. Once all the jobs are completed for one project, replacement corresponding to one project is completed. Then, for example, as depicted in FIG. 29, the host #A can use the target storage system #51 similarly to the source storage system #00.

<Progress Display>

The management server program 541 provides a progress display at one of the display levels including the overall job, the overall project, and the overall plan that is selected via a user operation. The management server program 541 can provide the progress display in one of host unit or VOL unit, job unit, and project unit that is selected via a user operation. To avoid confusing descriptions with one another, for the first type of progress display, plan, project, job, and the like are referred to as "display levels", and for the second type of progress display, project, job, and the like are referred to as "display units".

Furthermore, the management server program 541 displays the progress, according to time series, at one of the display levels including the overall job, the overall project, and the overall plan that is selected via a user operation.

Several specific examples of progress display will be described below.

<Progress Display in Host Unit or VOL Unit>

Figure 30:
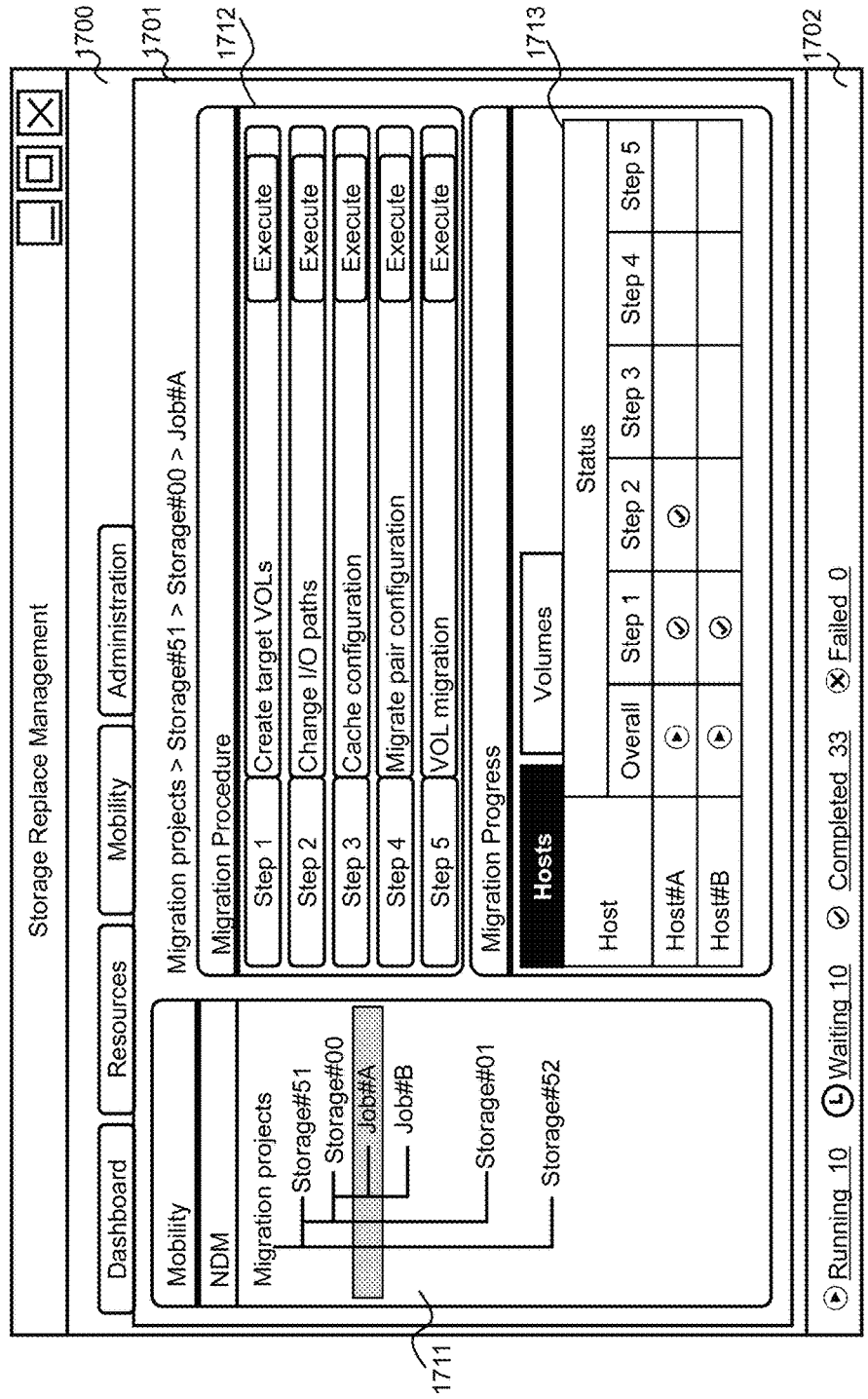
FIG. 30 is a diagram depicting an example of progress display in units of hosts or VOLs.

FIG. 30 depicts an example of progress display in host unit or VOL unit.

As described above, the first type of progress display is provided in the first support view 1712 in the replace management screen 1700, and the second type of progress display is provided in the second support view 1713 in the replace management screen 1700. The progress display in host unit or VOL unit is provided in the form of the second type of progress display. For example, when the job "Job#A" is selected in the migration tier view 1711 and a "Hosts" tab is selected, a host unit progress display illustrated in FIG. 30 is provided.

As depicted in FIG. 30, the host unit progress display includes, for each host, the identification number (or name) of the host, the overall status, and the status of each step in which the host is involved. The overall status is the status of the overall host. The step in which the host is involved may be a set of tasks in which the host is involved. The tasks (step) in which the host is involved are tasks (step) related to migration of VOLs accessible to the host. The status of the step has a null value "-" if none of the tasks belonging to the step has been started. Relations among tasks, steps and hosts are identified using the task management table 1600, the job management table 1500, the VOL management table 600, the LUN management table 1000, and the like. The host unit progress display in FIG. 30 is a host unit progress display of the overall job #00 ("Job##00"). The host unit progress display in FIG. 30 (a second type of progress display) allows the user to acknowledge the progress of the overall job #00 ("Job#00") for each host. For example, the host unit progress display indicates that the hosts #A and #B are involved in the job #00 and that, for the host #A, the process has been completed up to step 2 and that, for the host #B, the process has been completed up to step 1.

Although not depicted in the drawings, a VOL unit progress display is configured similarly to the host unit progress display. That is, the VOL unit progress display includes, for each source VOL, the identification number (or name) of the source VOL, the overall status, and the status of each step in which the source VOL (or target VOL) is involved.

Both the host unit progress display and the VOL unit progress display may be provided for either the overall project or the overall plan instead of the overall job. A rule for determining the overall status of the host or the VOL and each status of the step may be the same as a rule for determining the status of the step based on the status of each task (and a rule for determining the status of the job based on the status of the step). For example, when one of the tasks belonging to a certain step is "Waiting" or "Failed", the status of the step is also "Waiting" or "Failed".

Furthermore, when the progress display is being provided in host unit or VOL unit, the numerical value for each status in the status bar 1702 may be the number of those tasks, jobs, or projects of the tasks or the jobs belonging to the overall job, the overall project, or the overall plan which correspond to the status, or the total capacity of VOLs associated with those tasks, jobs, or projects of the tasks or the jobs belonging to the overall job, the overall project, or the overall plan which correspond to the status.

<<Overall-Project Progress Display and Job Unit Progress Display>>

Figure 31:
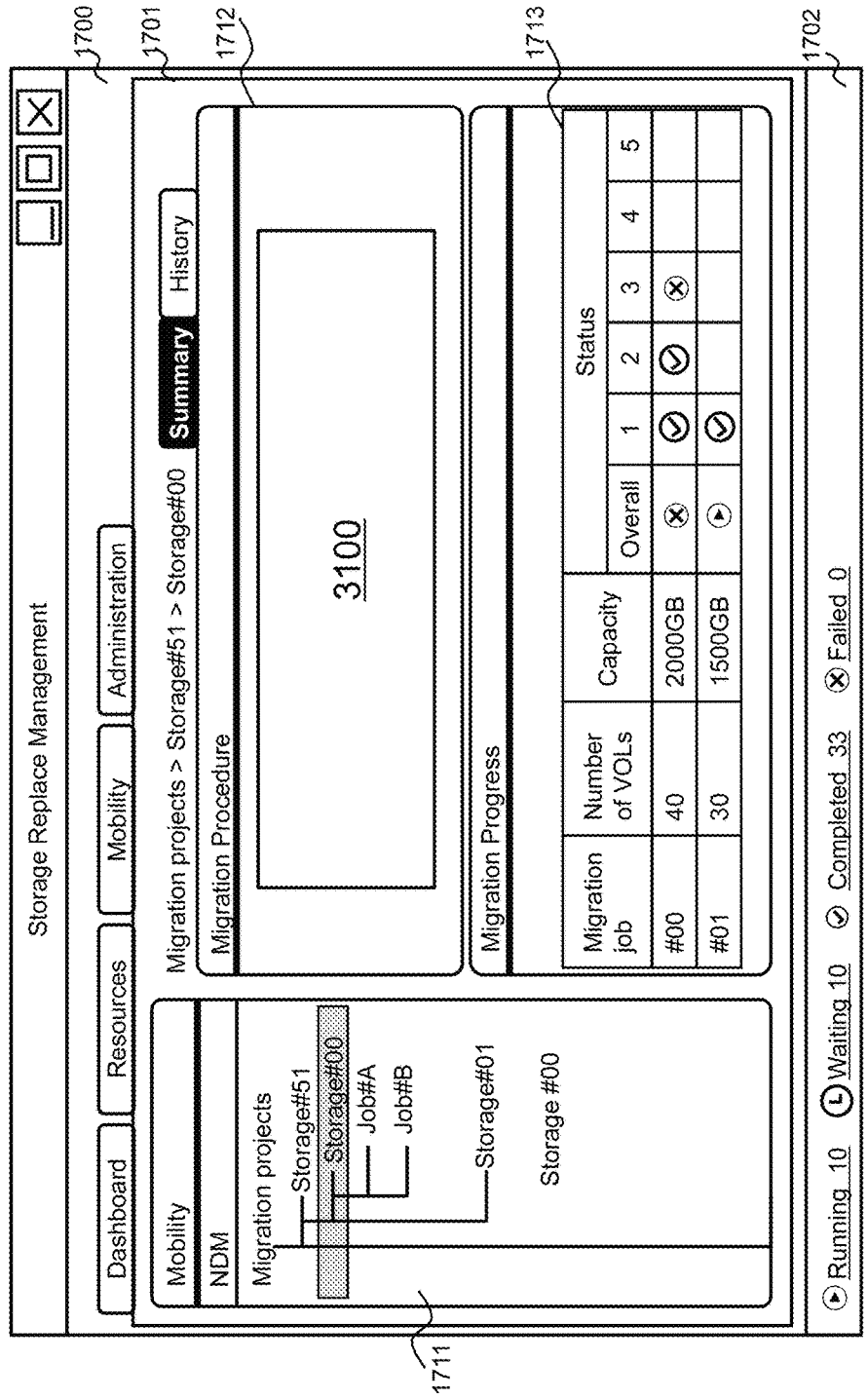
FIG. 31 is a diagram depicting an example of a replace management screen providing an overall-project progress display and a job unit progress display.
Figure 32:
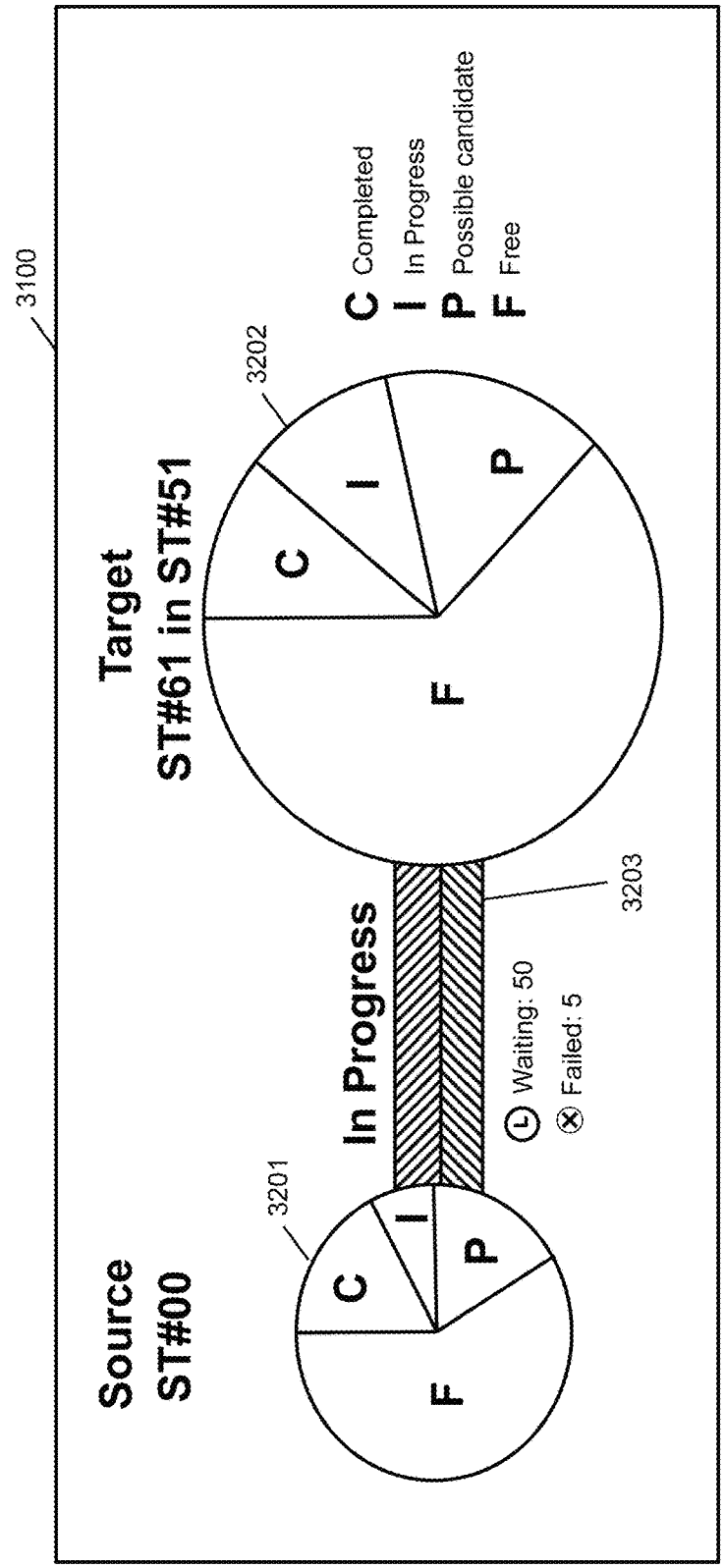
FIG. 32 is a diagram depicting an example of details of the overall-project progress display.

FIG. 31 and FIG. 32 depict an example of an overall-project progress display and an example of a job unit progress display, respectively. For example, in a replace management screen in FIG. 31, the source storage system "Storage#00" is selected in the migration tier view 1711 and of two tabs including a "Summary" tab and a "History" tab, the "Summary" tab is selected, whereby an overall-project progress display 3100 (FIG. 32) is provided.

The overall-project progress display is a first type of progress display, and the job unit progress display is a second type of progress display.

As depicted in FIG. 31, the job unit progress display includes, for each job, the identification number (or name) of the job, the number of source VOLs involved in the job, the total capacity of the source VOLs involved in the job, the overall status, and the status for each step. The identification number (or name) of the job, the number of source VOLs involved in the job, the total capacity of the source VOLs involved in the job, and the status for each step for the job are identified using the task management table 1600, the job management table 1500, the project management table 1400, the VOL management table 600, the LUN management table 1000, and the like. The job unit progress display in FIG. 31 is a job unit progress display of the overall project corresponding to the source storage system #00. The job unit progress display in FIG. 31 allows the user to acknowledge the progress of each job for the overall project. For example, the job unit progress display indicates that jobs #00 and #01 belong to the project and that, for the job #00, the process has progressed up to step 3, which has "Failed" (has been suspended), and that, for the job #01, the process has progressed up to step 1.

The job unit progress display may be provided for the overall plan rather than for the overall project. When the job unit progress display is being provided, the numerical value for each status in the status bar 1702 may be the number of those of the tasks or the jobs belonging to the overall job, the overall project, or the overall plan which correspond to the status, or the total capacity of VOLs associated with those of the tasks or the jobs belonging to the overall job, the overall project, or the overall plan which correspond to the status.

The overall-project progress display 3100 is a progress display in terms of the capacity of the VOLs as depicted in FIG. 32. Specifically, using the capacity of a plurality of source VOLs to be subjected to migration, the management server program 541 can display the progress in terms of the capacity of the target VOLs for which data has been migrated to the target storage system. An example of the progress display is the overall-project progress display 3100 depicted in FIG. 32.

As depicted in FIG. 32, the overall-project progress display 3100 has a target progress display 3202 corresponding to the target storage system, a source progress display 3201 corresponding to the source storage system, and an association object 3203 that associates the source progress display 3201 with the target progress display 3202.

The source progress display 3201 and the target progress display 3202 are each an object (for example, a pie chart), and the size of the object (for example, the area of the pie chart) depends on the capacity. Specifically, the size of the source progress display 3201 depends on the total capacity of the VOL set of the source storage system (the set of VOLs that can be subjected to migration). The size of the target progress display 3202 depends on the capacity of the target storage system (for example, the total of the total capacity of the target VOL and the total of physical capacities for which no job has been created and which can be a base for the target VOL).

Each of the source progress display 3201 and the target progress display 3202 includes at least one of the following four types of objects.

(A) a first object that has a size (for example, an area) based on the total capacity of VOLs belonging to "Completed" jobs or tasks and that has a display mode corresponding to "Completed" (the first object has, for example, a mark "C"), (B) a second object that has a size based on the total capacity of VOLs belonging to a job or task "In Progress" and that has a display mode corresponding to "In Progress" (the second object has, for example, a mark "I"), (C) a third object that has a size based on the total capacity of VOLs belonging to "Possible Candidate" and that corresponds to "Possible Candidate" (the third object has, for example, a mark "P"), and (D) a fourth object in a display mode corresponding to "Free" (the fourth object has, for example, a mark "F"). The status "Free" means a free resource, and specifically means a resource in the storage system (for example, a VOL, a pool, or a PG) that may be associated with migration but that is precluded from being associated with the plan (or project). For example, for the plan (or project), a resource in the source storage system belonging to "Free" is not associated with the plan (or project) but may be associated with another plan (or project). Similarly, for the plan (or project), a resource in the target storage system belonging to "Free" is not associated with the plan (or project) but may be associated with another plan (or project). The "display mode" of the object may be defined using at least one of color, mark (for example, text), pattern, line type, and display timing (for example, lighting or blinking).

The association object 3203 is, for example, a band extending from the source progress display 3201 to the target progress display 3202. The status of the project is displayed near the association object 3203. In the example in FIG. 32, the status of at least one job belongs to "In Progress", and thus, the status of the project is "In Progress". Furthermore, the number of jobs or tasks belonging to a status for suspension, that is, "Waiting" and the number of jobs or tasks belonging to "Waiting", are displayed near the association object 3203, and "Failed" and the number of jobs or tasks belonging to "Failed" are also displayed.

The user can acknowledge the progress of the overall project by viewing the overall-project progress display 3100. Specifically, the user can acknowledge the progress of the overall project while being conscious of the VOL capacity. When one job involves a plurality of source VOLs, not all of the source VOLs have the same capacity. Thus, displaying the progress in terms of the capacity allows the overall progress to be acknowledged more easily than displaying the progress in terms of the number of jobs. This also allows the progress to be acknowledged while distinguishing the capacity of VOLs for which migration is completed from the capacity of VOLs for which migration is under way. Thus, the progress and scale of the project can be simultaneously acknowledged. When the source VOL is a TPVOL, the source VOL capacity on which the progress display is based is a virtual capacity (the capacity of a TPVOL) and need not be an actual capacity (the total capacity of real pages allocated to the TPVOL). This is because the TPVOL is a VOL accessed by the host, and adopting the virtual capacity instead of the actual capacity allows the scale of migration to be appropriately expressed. However, the actual capacity may be adopted instead of the virtual capacity.

<<Overall-Plan Progress Display and Project Unit Progress Display>>

Figure 33:
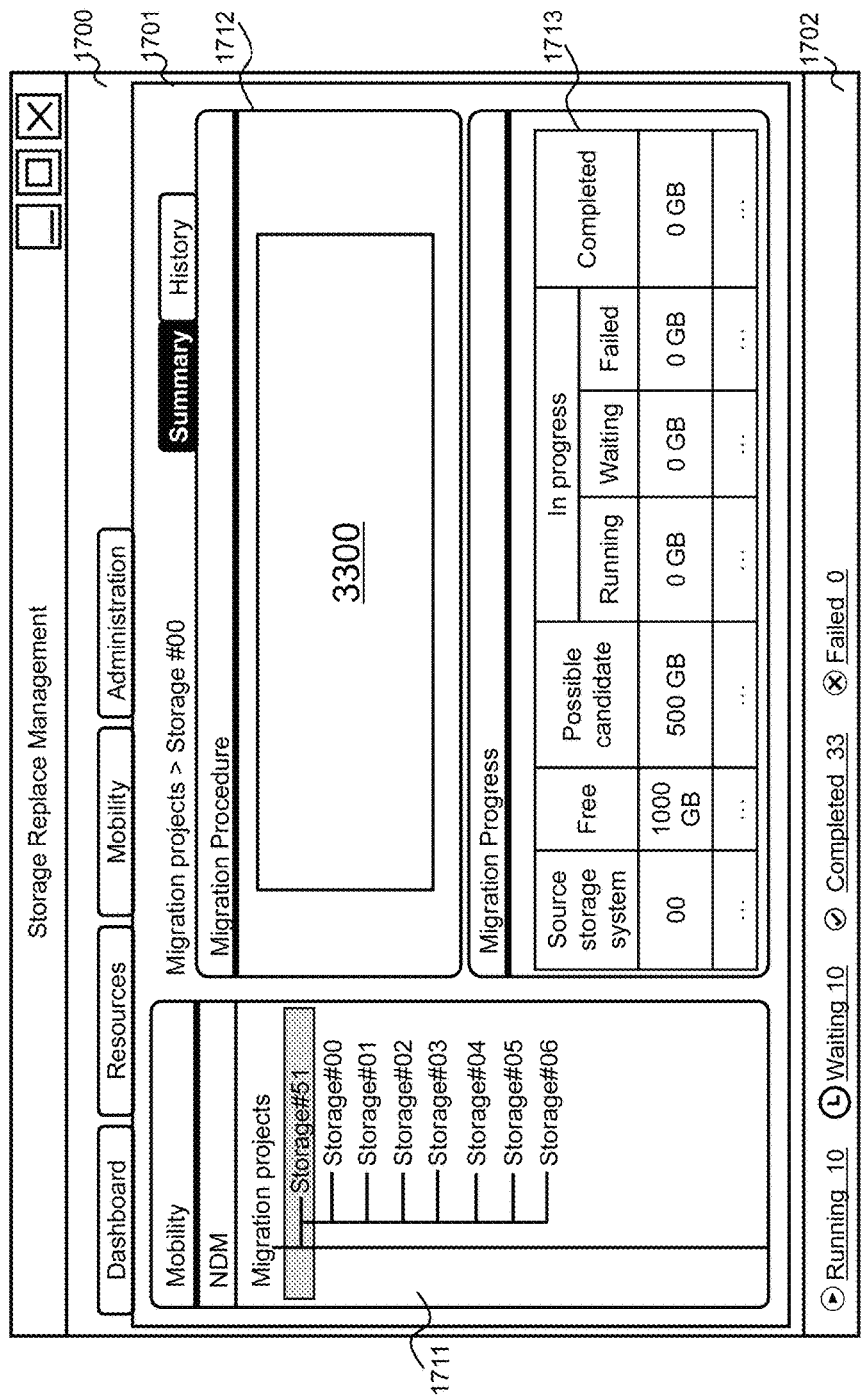
FIG. 33 is a diagram depicting an example of a replace management screen providing an overall-plan progress display and a project unit progress display.
Figure 34:
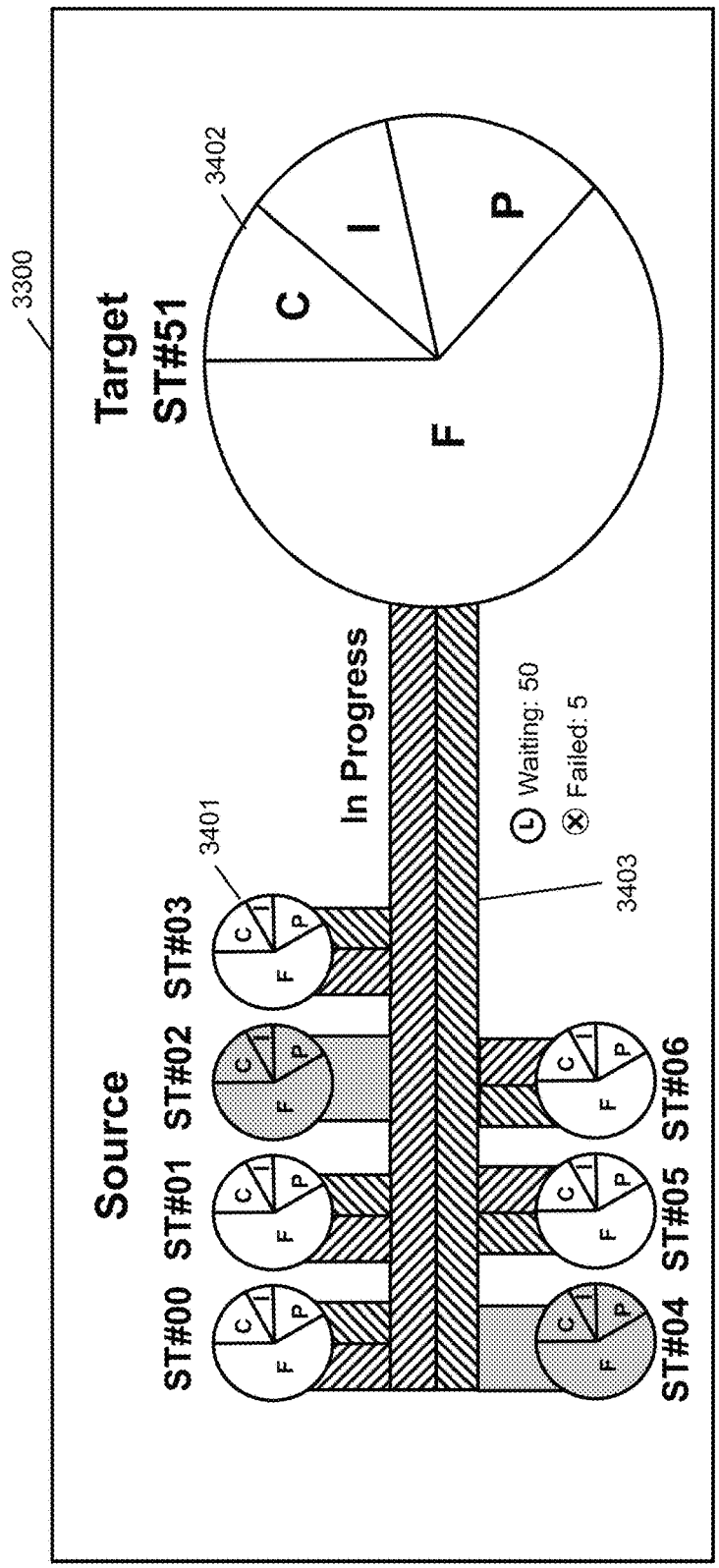
FIG. 34 is a diagram depicting an example of the overall-plan progress display.

FIG. 33 and FIG. 34 depict an example of an overall-plan progress display and an example of a project unit progress display, respectively. In a replace management screen in FIG. 33, selecting the "Summary" tab provides an overall-plan progress display 3300 (FIG. 34). For example, when the target storage system "Storage#51" is selected in the migration tier view 1711 and the "Summary" tab is selected, the overall-plan progress display illustrated in FIG. 32 is provided.

The overall-plan progress display is a first type of progress display, and the project unit progress display is a second type of progress display.

As depicted in FIG. 33, the project unit progress display has numerical values corresponding to the respective statuses for each storage system. The numerical values corresponding to the statuses are the total capacity of VOLs involved in jobs or tasks in the status. When the project unit progress display is being provided, the numerical value for each status in the status bar 1702 may be the number of those of the tasks or the jobs belonging to the overall project or the overall plan which correspond to the status, or the total capacity of VOLs associated with those of the tasks or the jobs belonging to the overall project or the overall plan which correspond to the status.

As depicted in FIG. 34, the overall-plan progress display 3300 is a progress display in terms of the capacity of VOLs similarly to the overall-project progress display 3100. Specifically, the overall-plan progress display 3300 has a target progress display 3402 corresponding to the target storage system, source progress displays 3401 corresponding to all source storage systems (for example, seven source storage systems #00 to #06) corresponding to the target storage system, and an association object 3403 that associate all the source progress displays 3401 with the target progress display 3402. Configurations of each of the source progress displays 3401 and the target progress display 3402 are the same as the configurations of the source progress display 3201 and the target progress display 3402 depicted in FIG. 32. Furthermore, a configuration of the association object 3403 is the same as the configuration of the association object 3203 depicted in FIG. 32.

In the overall-plan progress display 3300, the display mode of a source progress display of a source storage system corresponding to a job in a suspension state is a display mode meaning the suspension state. For example, the source storage systems #02 and #04 corresponding to jobs with at least one of "Waiting" and "Failed" are identified by the management server program 541 based on the job management table 1500, the project management table 1400, and the like. As depicted in FIG. 34, the overall source progress display 3401 of each of the source storage systems #02 and #04 is depicted in gray by the management server program 541. Consequently, the user determines that, for each of the source storage systems #02 and #04, an operation for canceling the suspension state (for example, canceling "Waiting" via a user operation or changing the status of the resource from "Error" to "Normal" for recovery to cancel "Failed") needs to be performed in order to promote the job execution.

<<Progress Time-Series Display>>

As described above, the management server program 541 manages and updates the progress history management table 1300 (see FIG. 13). The progress history management table 1300 includes, for each of project, job, and task, one or more sets of a time (for example, a date or a time more specific than the date) and a snapshot progress that is a progress corresponding to the time. Based on the progress history management table 1300, the management server program 541 displays, according to time series, the progress of one of the targets including the overall job, the overall project, and the overall plan that is selected by the user operation. A progress time-series display of the overall plan will be described below by way of example.

Figure 35:
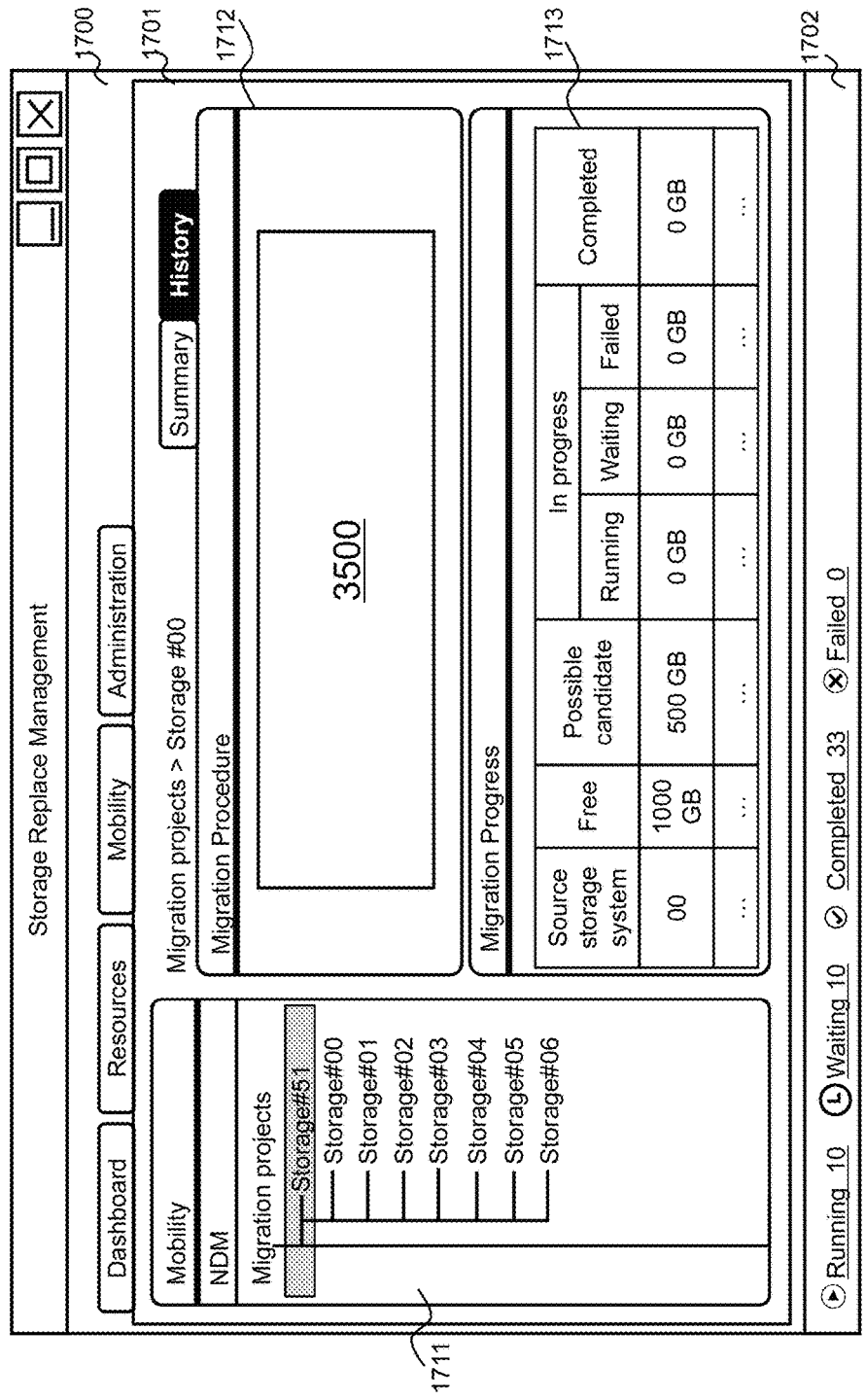
FIG. 35 is a diagram depicting an example of the replace management screen in which a "History" tab has been selected.

For example, in a replace management screen in FIG. 35 (the screen in which the target storage system #51 has been selected), selecting the "History" tab provides a progress time-series display 3500 of the overall plan (FIG. 34).

Figure 36:
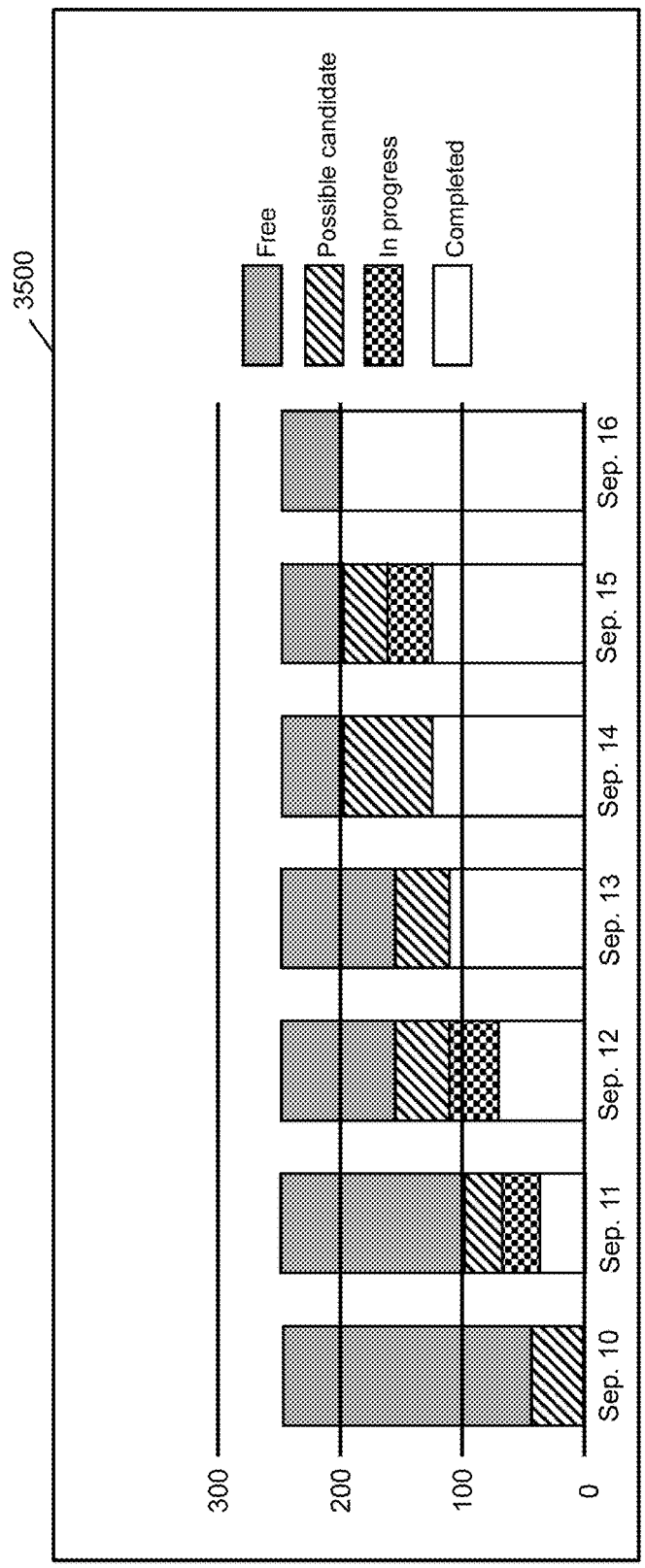
FIG. 36 is a diagram depicting an example of details of a progress time-series display of an overall plan.

FIG. 36 depicts an example of details of the progress time-series display 3500 of the overall plan.

In the progress time-series display 3500 of the overall plan in FIG. 36, the progresses of the overall plan on the days from Sep. 10, 2014 through Sep. 16, 2014 (an example of a display period) are arranged according to time series. The display period is designated via a user operation and can be changed via a user operation. Furthermore, in FIG. 36, the overall-plan progress is displayed in units of days. However, the display unit may be a unit larger than day (for example, week) or a unit smaller than day (for example, hour). Furthermore, the overall-plan progress display is a pie chart. However, in the progress time-series display 3500 of the overall plan, target progress displays in the overall-plan progress display may be arranged in the form of bar graphs according to time series. The length of each bar graph corresponds to the magnitude of the capacity.

Upon receiving a designation of the user's desired time point during the display period for the progress time-series display 3500 of the overall plan (for example, a mouse cursor is moved to the user's desired time point, which is then double-clicked), the management server program 541 provides a snapshot progress display corresponding to the designated time point (an overall-plan progress display corresponding to the designated time point (for example, a progress display 3300 in FIG. 34)). The management server program 541 may accept, in addition to the user's desired time point, a designation of the display level (the overall plan, the overall project, or the overall job) of the snapshot progress display and may display the snapshot progress display at the designated time point at the designated display level. The management server program 541 can identify a table (based on the snapshot progress display) corresponding to the designated time point (and display level) using the progress history management table 1300 to create and provide a snapshot progress display based on the identified table.

As described above, in an example of the snapshot progress display, a source progress display and a target progress display are depicted in association with each other and are each a pie chart of a size based on the capacity as depicted in FIG. 32 and FIG. 34. However, in the progress time-series display 3500, target progress displays or source progress displays are arranged according to time series. In the overall-plan progress time-series display, target progress displays may be arranged according to time series. In the overall-project progress time series display, source progress displays may be arranged according to time series. Alternatively, in the progress time-series display, reduced images or summary images of the snapshot progress display may be arranged according to time series.

The progress time-series display, for example, enables the following.

(1) Progress Management Support

For example, the overall situation can be determined based on the following considerations for determination.

Scheduling period: whether a schedule is smoothly arranged (whether the numerical value for "Possible Candidate" is on the increase) Setup period: whether migration is smoothly under way (whether the total of the numerical value for "In Progress" and the numerical value for "Completed" is on the increase)

Migration period: whether the schedule has prospect for realization.

Completion period: whether the schedule has prospect for completion (whether the numerical value for "Completed" is close to a target value)

Others: for example, whether or not holidays are effectively utilized (whether the numerical value for "Completed" increases during holidays)

(2) Support or Prediction for Future Replace Plan

For example, based on a relation between the total capacity of VOLs to be subjected to migration during first replacement and the progress time-series display for the first replacement and on the total capacity of VOLs to be subjected to migration during second replacement, it is possible to predict how many days before execution of the second replacement a schedule for the second replacement needs to be arranged in order to complete the second replacement.

<Process Flow>

A plurality of processes including processes executed by the management server program 541 will be described.

The management server program 541 receives configuration information (for example, information including information indicative of relations among PGs, pools, VOLs, and ports) from a plurality of storage systems 551 (and the host 553), and create a management table group 542 based on the received configuration information.

Furthermore, the management server program 541 checks and updates the status of the task.

Figure 37:
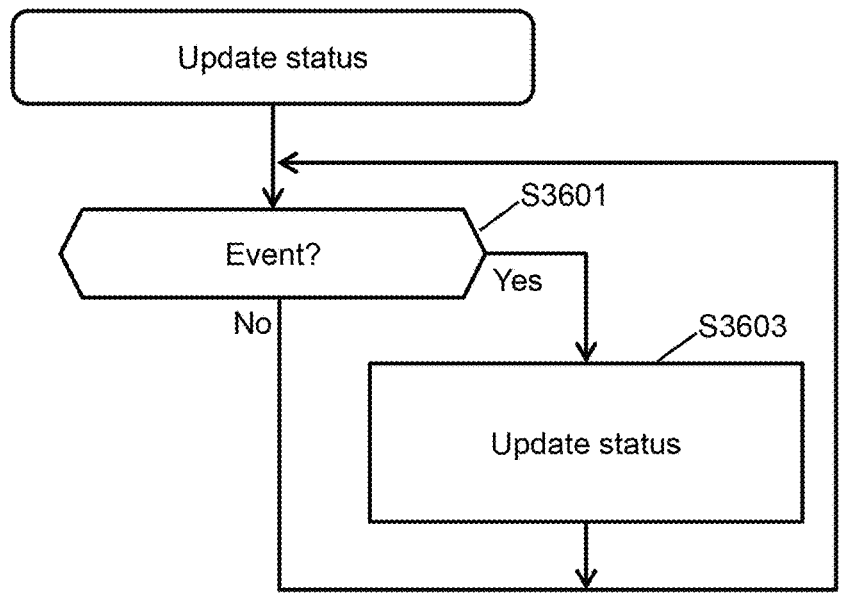
FIG. 37 is a diagram depicting a flow of a status update process.

FIG. 37 illustrates a flow of a status update process.

When an event occurs (S3601: Yes), the management server program 541 performs status update based on the resultant event (S3602).

For example, the management server program 541 repeatedly issues an inquiry to at least one of the source storage system 551S and the target storage system 551T (or the individual management system. 110P) to receive responses to the inquiries. Furthermore, for example, the management server program 541 can receive a notification for a status change (for example, a fault occurrence notification including the identification number of a resource in which a fault has occurred) from the storage system 551, the individual management system 110P, or the host management system 120. "Event has occurred" in S3601 may be reception of a response or a notification indicative of a change in the status of the task.

In the status update in S3602, the management server program 541 updates the status of the task (update of the task management table 1600). The management server program 541 may perform at least one of updating the status of the step to which the task the status of which has been changed belongs (update of the job management table 1500) and updating the status of the job to which the step the status of which has been changed belongs (update of the job management table 1500 and the project management table 1400), as needed.

Figure 38:
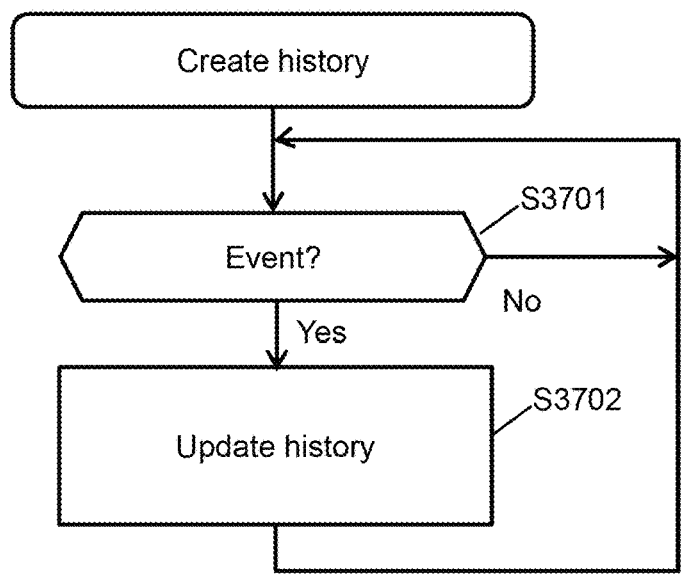
FIG. 38 is a diagram depicting a flow of a history update process.

FIG. 38 illustrates a flow of a history update process.

When an event occurs (S3701: Yes), the management server program 541 updates the progress history management table 1300 (S3702). "Event has occurred" in S3701 may be, for example, arrival at a predetermined time. In S3702, a snapshot progress for association (at least one of the project management table 1400, job management table 1500, and task management table 1600 corresponding to the snapshot progress) is added to the progress history management table 1300.

Figure 39:
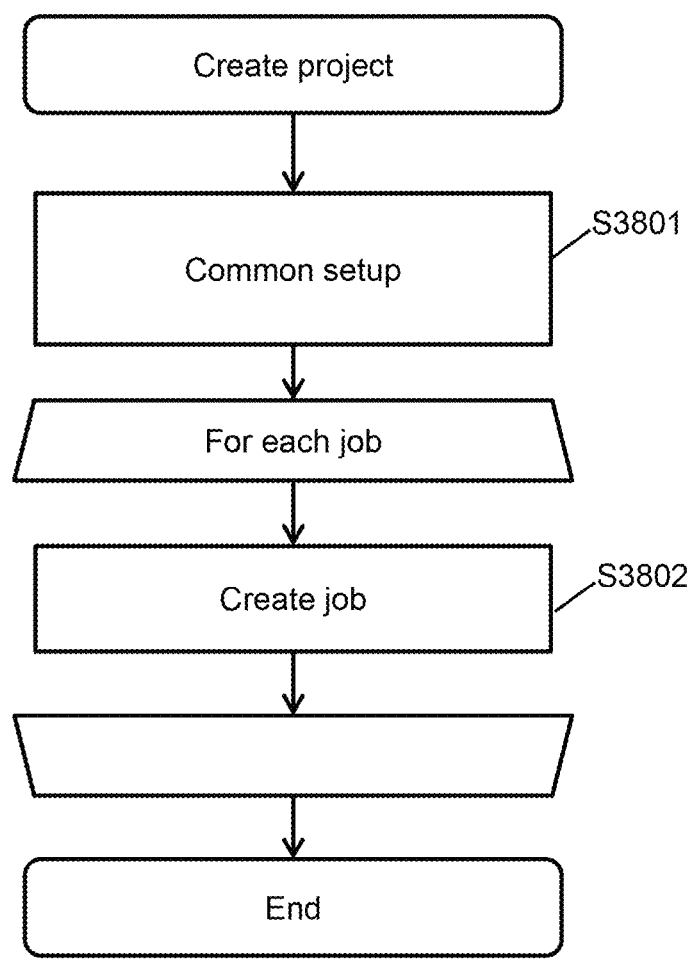
FIG. 39 is a diagram depicting a flow of a project creation process.

FIG. 39 illustrates a flow of a project creation process.

The common configuration is performed (S3801). In the common configuration, for example, a selected source storage system is added to a selected target storage system, and subsequently, RG mapping, external-pass configuration, and I/O port mapping are performed. The management server program 541 registers, in the project management table 1400, needed pieces of the information input during the common configuration via a user operation and the information determined based on the input information.

Subsequently, the job creation is performed for each job (S3802). The management server program 541 may display a job creation screen and accept a job definition condition via the job creation screen each time S3802 is executed, or may perform a plurality of job creations (S3802) based on one job definition condition designated via the job creation screen.

Figure 40:
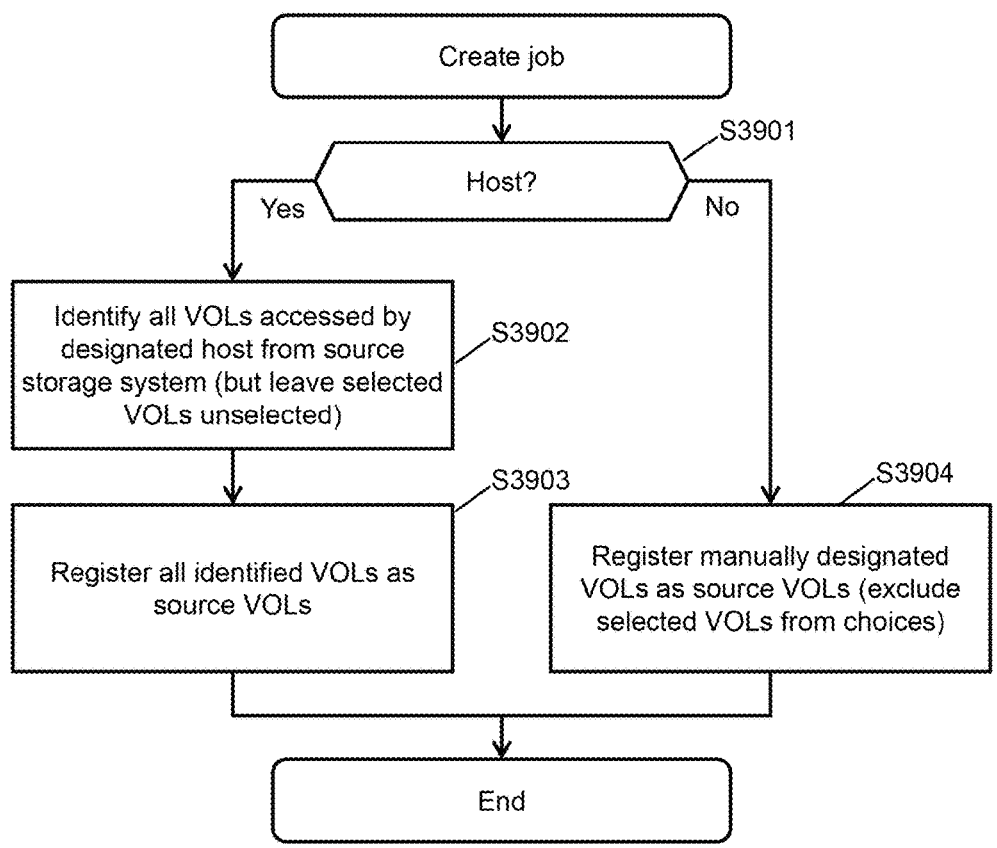
FIG. 40 is a diagram depicting a flow of a job creation process.

FIG. 40 illustrates a flow of a job creation process.

When the "host" is selected as a job definition condition (S3901: No), the management server program 541 identifies all the VOLs accessed by the designated host from the VOL set held by the source storage system (for example, the VOL set held by the source RG to be subjected to migration) (S3902). The VOLs are identified using the VOL management table 600, the LUN management table 1000, and the HG management table 1100. The management server program 541 registers the identified VOLs as source VOLs, creates a job for the registered source VOLs, and registers information on the created job in the job management table 1500 (S3903). In S3902, the management server program 541 identifies VOLs selected for other jobs or the like based on the job management table 1500 and the like, leaves the identified selected VOLs unselected, and identifies the VOLs accessed by the designated host from the VOLs other than the identified selected VOLs.

When "Manual" is selected as a job definition condition (S3901: No), the management server program 541 registers manually designated VOLs as source VOLs, creates a job for the registered source VOLs, and registers information on the created job in the job management table 1500 (S3904). In S3904, the management server program 541 does not provide the user with VOLs selected for other jobs or the like as choices of source VOL candidates, and provide the user with only selectable VOLs other than the VOLs selected for other jobs or the like, as choices of source VOL candidates.

Figure 41:
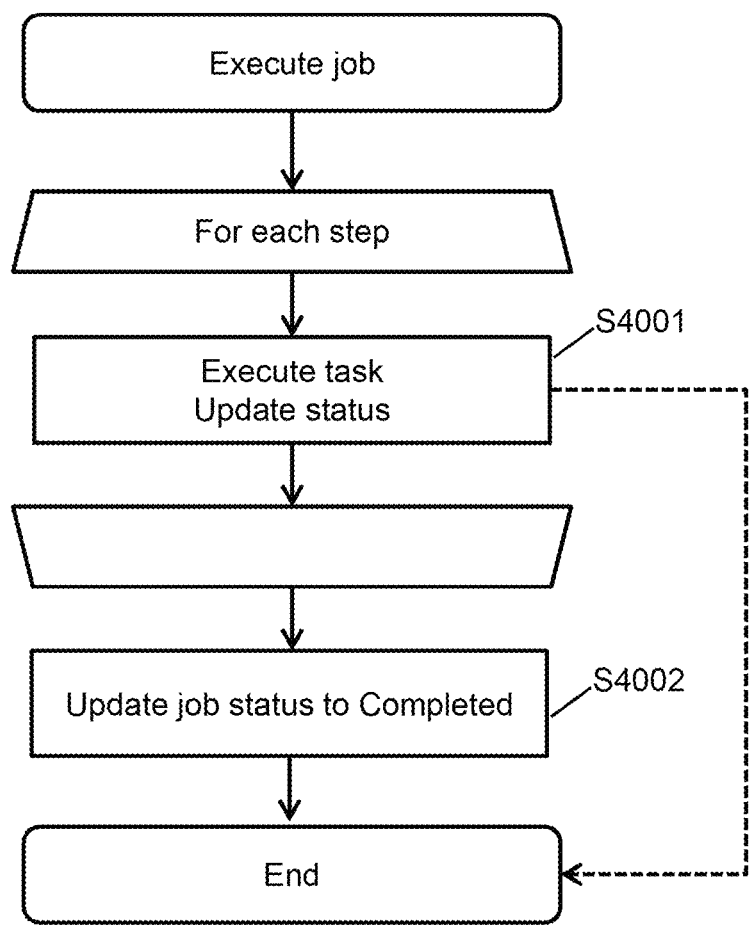
FIG. 41 is a diagram depicting a flow of a job execution process.

FIG. 41 illustrates a flow of a job execution process. The job execution process is a process for one job designated via a user operation. Therefore, the job execution process is executed for each job.

S4001 is executed for each step. In S4001, a task belonging to the step started to be executed is carried out. The execution of the step may be started in response to specification of the start via a user operation or started without any user operation. Upon detecting completion of the task, the management server program 541 updates the status of the task to "Complete" (update of the task management table 1600). The management server program 541 performs at least one of update of the status of the step to which the task belongs (update of the job management table 1500) and update of the status of the job to which the step belongs (update of the job management table 1500 and the project management table 1400), as needed. Upon detecting a fault in the resource for the executed task or to suspend the job execution in order to wait for a user operation, the management server program 541 updates the status of the task to "Failed" or "Waiting" (also updates the status of the step and job to which the task belongs to "Failed" or "Waiting") and suspends (temporarily ends) the job execution as depicted by a dashed line. Furthermore, in S4001, the completion of the task may be detected based on an input via a user operation, or a response (a response to an inquiry from the management server program 541) or a notification (a notification received without any inquiry from the management server program 541) from at least one of the source storage system, target storage system, the individual management system and the host management system.

When the statuses of all the steps are set to "Completed", the management server program 541 updates the status of the job to "Completed" (S4002).

Figure 42:
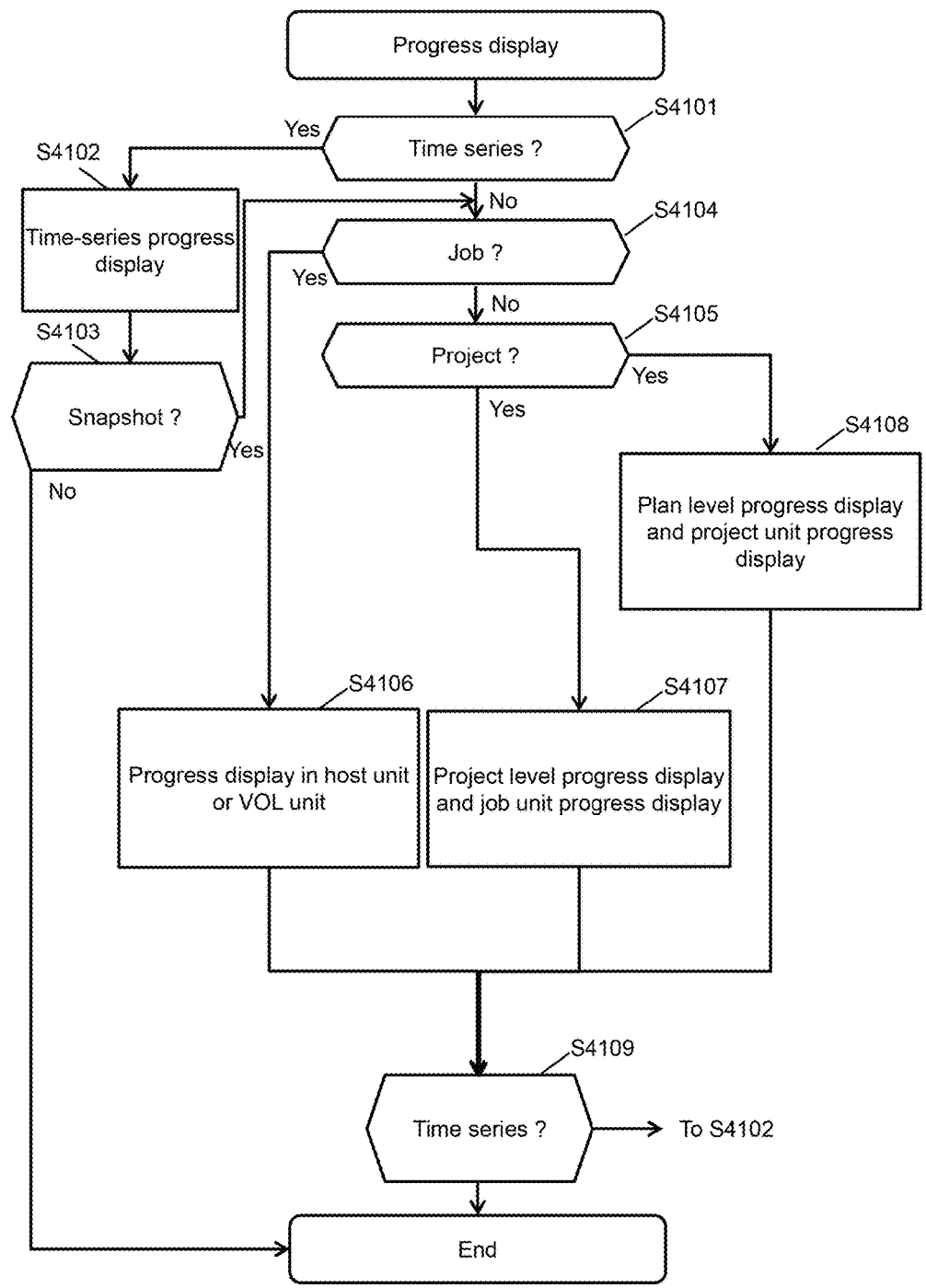
FIG. 42 is a diagram depicting a flow of a progress display control process.

FIG. 42 illustrates a flow of a progress display control process.

Upon receiving a designation of time-series progress display (S4101: Yes), the management server program 541 executes a time-series progress display process (S4102). Specifically, the management server program 541 identifies snapshot progress information (for example, any two or more of the project management table 1400, the job management table 1500, and the task management table 1600) belonging to a display period (for example, a period designated via a user operation) at a display level (for example, a display level designated via a user operation) based on the progress history management table 1300. The management server program 541 calculates, for each status, the capacity (for example, the total capacity of VOLs with which the tasks corresponding to the status are involved) and the number of operations (for example, the number of tasks or jobs corresponding to the status) for each time point belonging to the display period based on the designated snapshot progress information. The management server program 541 creates and provides a progress time-series display based on the calculated capacity (or number of operations) for each status. A user operation may be used to enable switching of whether progress displays arranged according to time series in the progress time-series display are based on the capacity or the number of operations.

Upon receiving a designation of a snapshot progress display for the progress time-series display (S4103: Yes), the management server program 541 executes a snapshot progress display process in S4104 to S4109.

Upon receiving a designation of a snapshot progress display (S4101: No or S4103: Yes), the management server program 541 identifies the display level.

When the display level is the job level (S4104: Yes), a guide for the job execution (or an overall-job progress display) is provided as a first type of progress display, and a progress display in host unit or VOL unit is created and provided as a second type of progress display, as illustrated in FIG. 30 (S4106). In S4106, for example, the management server program 541 calculates the number or capacity of tasks belonging to the selected project or plan (the capacity of VOLs with which the tasks are involved) for each host (or each VOL) involved in the selected project or plan based on the job management table 1500 and the task management table 1600. Then, the management server program 541 creates and provides a progress display in host unit or VOL unit in which the calculated number (or capacity) for each status is displayed for each host (or each VOL) based on the calculated number of operations (or capacity) for each status.

When the display level is the project level (S4105: Yes), an overall-project progress display is created and provided as a first type of progress display, and a job unit progress display is created and provided as a second type of progress display (S4107), as illustrated in FIG. 31 and FIG. 32. In S4107, for example, the management server program 541 calculates the number or capacity of tasks belonging to the selected project (or the plan to which the project belongs) based on the RG management table 403, the PG management table 800, the project management table 1400, the job management table 1500, and the task management table 1600. Then, based on the capacity calculated for each status, the management server program 541 creates and provides an overall-project progress display including a source progress display and a target progress display, as a first type of progress display, and creates and provides, as a second type of progress display, a job unit progress display in which the number of jobs for each status is displayed for each job.

When the display level is the plan level (S4105: No), an overall-plan progress display is created and provided as a first type of progress display, and a project unit progress display is created and provided as a second type of progress display (S4108), as illustrated in FIG. 33 and FIG. 34. In S4108, for example, the management server program 541 calculates the number or capacity of tasks belonging to the selected plan for each project (source storage system) belonging to the plan based on the RG management table 403, the PG management table 800, the project management table 1400, the job management table 1500, and the task management table 1600. Then, based on the capacity calculated for each status, the management server program 541 creates and provides, as a first type of progress display, a plan over-all progress display including a plurality of source progress displays (or one source progress display) and one target progress display, and creates and provides, as a second type of progress display, a project unit progress display in which the number of projects or the like for each status is displayed for each project.

Upon receiving a designation of a progress time-series display after S4106 to S4108 (S4109: Yes), the management server program 541 executes a progress time-series display process (S4102) at the display level of the first type of progress display.

The present embodiment has been described. The following can be derived from the above descriptions.

First Aspect

A management system has an interface device coupled to a plurality of storage systems, a storage resource configured to store management information including information with respect to a configuration of the plurality of storage systems, and a processor coupled to the interface device and the storage resource. The processor (A) receives a designation of the replace target storage system among the plurality of storage systems and a designation of the replace source storage system among the plurality of storage systems. Each of the plurality of storage systems is a storage system discovered by the processor via a communication network. The processor (B) receives a job definition condition that defines a migration job corresponding to partial migration that is part of data migration for replacement from the replace source storage system to the replace target storage system. The processor receives at least one of a designation of the replace target storage system, a designation of the replace source storage system, and the job definition condition, from an input device operated by a user. The processor (C) selects one or more volumes from the volume set as one or more source volumes and creates a migration job for the selected one or more source volumes, based on the management information in accordance with the job definition condition. The migration job is a job in which, for each of the one or more source volumes, a target volume that is a volume having the same capacity as that of the source volume is created in the replace target storage system, and in which data is migrated from each of the one or more source volumes to a corresponding one of the one or more target volumes. The processor (D) executes each a plurality of migration jobs corresponding to a plurality of partial migrations included in the data migration. Two or more migration jobs may be created based on one job definition condition or one migration job may be created for one job definition condition. Two or more migration jobs may be created simultaneously or at different timings.

According to the first aspect, replacement of storage systems is enabled with adverse effects on operations suppressed.

Second Aspect

In the first aspect, the processor (E) uses the capacity of a plurality of source volumes for the replace source storage system to display progress in terms of the capacity of target volumes for which data has been migrated to the replace target storage system. This progress display may deploy, in one screen, an object in a display mode based on "the capacity of a plurality of source volumes for the replace source storage system" and an object in a display mode based on "the capacity of target volumes for which data has been migrated to the replace target storage system". When the replace source storage system is an RG or a virtual storage system, an object may also be displayed which is associated with the object in a display mode based on "the capacity of a plurality of source volumes for the replace source storage system" and which has a display mode based on the capacity of a volume set of a physical storage system or a virtual storage system having the replace source storage system (RG or virtual storage system). The "display mode" of the object may be defined using at least one of color, mark (for example, text), pattern, line type, and display timing (for example, lighting or blinking).

According to the second aspect, the progress of replacement including data migration divided into a plurality of jobs can be acknowledged in consideration of the volume capacity. When one job involves a plurality of source VOLs, not all of the plurality of source VOLs has the same capacity. Thus, displaying the progress in terms of the capacity allows the overall progress to be acknowledged more easily than displaying the progress in terms of the number of jobs.

Third Aspect

In the second aspect, the progress display in (E) is a display in which, for each of the replace source storage system and the replace target storage system, the volume capacity for data migrated by a completed migration job is distinguished from the volume capacity for data being migrated by a migration job in execution.

According to the third aspect, the capacity of volumes for which migration has been completed can be distinguished from the capacity of volumes for which migration is in execution, allowing the progress to be acknowledged. Thus, the progress and scale of the project can be simultaneously acknowledged.

The progress display in accordance with the second or third aspect represents the progress of the overall project or the overall plan. For example, the progress display in accordance with the second or third aspect may include a first object that has a size based on the total capacity of volumes belonging to "Completed" (migrated) jobs or tasks and that has a display mode corresponding to "Completed", a second object that has a size based on the total capacity of volumes belonging to a job or task "In Progress" (being migrated) and that has a display mode corresponding to "In Progress", a third object that has a size based on the total capacity of volumes belonging to "Possible Candidate" (a portion that has not belonged to any job yet but that may be a migration target for the project) and that corresponds to "Possible Candidate", and a fourth object that has a size based on the capacity of resources belonging to "Free" (free space in the target storage system) and that has a display mode corresponding to "Free". This allows the overall progress to be acknowledged and thus allows easy determination of whether or not to further increase the number of jobs, whether or not to execute the job, whether or not to increase the number of replace source storage systems with respect to replace target storage systems, and the like.

Furthermore, the progress display in accordance with the second or third aspect may include the number of pieces of information (for example, the number) on at least one of a stopped task and a stopped job (for example, tasks and jobs belonging to "Failed" or "Waiting"). A job or project linked to the stopped task or job can be identified, and therefore, the user can care a job or project hindered from being executed.

Fourth Aspect

In the third aspect, a plurality of replace source storage systems is present for the replace target storage system. The progress display in (E) is a target progress display and a plurality of source progress displays deployed in the same screen. The target progress display is a display of the progress for the replace target storage system. The plurality of source progress displays corresponds to the respective replace source storage systems. Each of the source progress displays is a display of progress for the replace source storage system corresponding to the source progress display. The display mode of a source progress display of a replace source storage system corresponding to a migration job in a suspension state is a display mode meaning the suspension state. The "migration job in the suspension state" may be at least one of a migration job including a task that is not started without an indication in accordance with a user operation and a migration job including a task stopped due to a fault or the like. Furthermore, for each replace source storage system, display elements for the replace source storage system (for example, a set of the above-described first to fourth objects) may be displayed.

According to the fourth aspect, in a case where the volumes of a plurality of replace source storage systems are aggregated into one replace target storage system (a case where the replace target is a storage system having a capacity or capability several times as the capacity or capability of one replace source storage system), the plurality of replace source storage systems can be integrated into one replace target storage system, and the progress of the overall plan related to the integration can be acknowledged. For example, the number of replace source storage systems in the suspension state can be acknowledged.

Fifth Aspect

In the fourth aspect, the progress display in (E) is a snapshot display that is the plurality of source progress displays and the target progress display deployed in one screen. The processor (F) displays, for the replace target storage system, time-series changes in the progress of data migration from the plurality of replace source storage systems. The processor receives a designation of a time for the display in (F) and performs the snapshot display in (E) at the designated time. In the fifth aspect, any one of the first to fourth aspects, the progress display in (F) (time-series display) may be performed. In the fifth aspect, display may be performed in accordance with a display mode selected from a plurality of display modes including a time-series display mode for the progress display in (F) and a snapshot display mode for the progress display in (E). Furthermore, in the fifth aspect, in order to secure a large display area for the time-series display, the progress display (snapshot display) of the individual replace sources is omitted during the time-series display, and a snapshot display (for example, a progress table for a replace source storage system selected in accordance with a user operation) may be provided for detailed analysis.

According to the fifth aspect, the time-series display of the progress allows progress management for projects (or plans) to be supported.

Sixth Aspect

In any one of the first to fifth aspects, the volume set includes a plurality of volumes accessed by one or more hosts. The job definition condition is a host. In (C), when the job definition condition represents a host, the selected one or more source volumes are all volumes accessed by the host identified in accordance with the job definition condition. In the job definition condition, the host may be individually designated or a host unit may be designated. In the latter case, a plurality of migration jobs may be created based on one job definition condition.

One important matter for replacement of storage systems is a change of an I/O path (an access path from the host to a volume). A change of the I/O path is particularly important for replacement with no stoppage of I/Os as in the above-described embodiment. This is because I/O performance may suffer adverse effects (for example, mis-configuration at a path change target or overloading at the path change target) as a result of a change of the I/O path.

Moreover, in general, a storage manager and a host manager are different, and changing the configuration of the host for the convenience of management of the storage system is not easy for a reason such as the convenience of operations of the host manager.

Furthermore, operations performed on the host accompanying a change of the I/O path are generally not easy. The operations involve, for example, identifying the file name of a device to which a volume recognized by the host is allocated, configuring an alternate path (a path of the path change target) for the path management program of the host, and checking whether or not to succeed in I/Os from the host via the alternate path.

The need for many changes of the I/O path increases workloads. In the case where the storage manager and the host manager are different, more communication is needed between the storage manager and the host manager.

According to the sixth aspect, all the source volumes used by the designated host belong to one migration job, and thus, changes of one or more I/O paths associated with the designated host can be completed during one migration job. Consequently, workloads for changes in I/O path and the communication between the storage manager and the host manager can be reduced. In the sixth aspect, the plurality of hosts designated for the job definition condition may be a plurality of hosts that executes the same application program. This enables creation of migration jobs in units of applications (execution of partial migrations).

Seventh Aspect

In any one of the first to sixth aspects, when the volume set includes a primary volume paired with a secondary volume, the processor creates, during migration job execution in (D), a pair having, as a primary volume, a target volume corresponding to a source volume serving as the primary volume.

The migration target is a volume, and the volume set in one replace source storage system is divisionally migrated in accordance with a plurality of jobs. Thus, this concept excludes creation of pairs in the replace target storage system before job creation and concurrent creation of pairs in the replace target storage system after all the jobs are completed. Besides, if the job is ended, migration of the volumes belonging to the job should have been completed (=normal state). Consequently, creation of pairs should have been ended when migration is completed. According to the seventh aspect, the pair re-creation in accordance with the above-described concept (creation of pairs in the replace target storage system) is implemented.

Eighth Aspect

In any one of the first to seventh aspects, the processor displays a migration tier view. In the migration tier view, the replace target storage system is displayed on the uppermost tier, and the replace source storage system for the replace target storage system is displayed immediately below the replace target storage system. The migration job corresponding to the replace source storage system is displayed immediately below the replace source storage system. The tier display with the replace target storage system displayed on the uppermost tier may be displayed for each replace target storage system.

According to the eighth aspect, a tier display is adopted in which the replace target storage system is displayed on the uppermost tier, and thus, the tier configuration of one plan (the replace source storage system and the migration job corresponding to the replace target storage system) can be easily acknowledged based on the migration tier view.

Ninth Aspect

In any one of the first to eighth aspects, in creating a migration job in accordance with the job definition condition (for example, the job definition condition in accordance with the sixth aspect) the processor selects, as a source volume, a volume other than volumes selected for the created migration job from the volume set.

According to the ninth aspect, when a migration job is created, duplicate selection of the volumes already selected for another migration job as the source volumes is avoided.

Tenth Aspect

In any one of the first to ninth aspects, the processor receives a common configuration indication for execution of common configuration for data migration from the replace source storage to the replace target storage system, and executes the common configuration in accordance with the common configuration indication. The common configuration may be executed on at least one of the host, the replace source storage system, and the replace target storage system via one or more computers (for example, at least one of the above-described storage individual management system and host management system) or without the agency of the one or more computers. The processor receives the job definition condition after executing the common configuration. The processor executes each of a plurality of migration jobs based on the common configuration.

According to the tenth aspect, duplicate configuration of items common to one replace source storage system can be avoided.

One operation included in the replacement is I/O mapping that refers to mapping of an I/O port of the replace source storage system (the port that accepts I/Os from the host) to an I/O port of the replace target storage system. However, in the tenth aspect, the I/O mapping is not included in the individual migration jobs but is included in the common configuration. The I/O port may be associated with a host group, and the need for I/O mapping for each job makes management of the host group and the like complicated. According to the tenth aspect, the need for such complicated management and the like can be eliminated.

Eleventh Aspect

In anyone of the first to tenth aspects, for one replace source storage system, the processor displays progress in units of jobs (that is, displays the progress for each migration job). The display of job unit progress includes, for example, a plurality of steps included in the corresponding migration job and a display of the status of each of plurality of steps. The status of the step may be a status in accordance with the status of each task belonging to the step. The statuses of the individual tasks are monitored and updated by the processor. The processor displays the job unit progress based on the updated task status.

According to the eleventh aspect, the progress for one replace source storage system can be acknowledged for each job.

One embodiment has been described. However, the embodiment is illustrative for description of the present invention and is not intended to limit the scope of the present invention only to this embodiment. The present invention can be implemented in various other forms. For example, in the above-described embodiment, replacement from the migration source storage system to the migration target storage system is performed without stoppage of I/Os (accesses) from the host to the migration source storage system or the migration target storage system. However, alternatively, the I/Os from the host may be stopped so that replacement of the storage systems can be performed while the accesses are stopped.

REFERENCE SIGNS LIST

100 Computer system
555 Management client
557 Management server

The invention claimed is:

1. A management system for replacement from a replace source storage system to a replace target storage system, the replacement including data migration that is migration of data in a volume set held by the replace source storage system to the replace target storage system, the management system comprising:
an interface device coupled to a plurality of storage systems;

a storage resource configured to store management information including information with respect to a configuration of the plurality of storage systems; and
a processor coupled to the interface device and the storage resource,
the processor being configured to
(A) receive a designation of the replace target storage system among the plurality of storage systems and a designation of the replace source storage system among the plurality of storage systems,
(B) receive a job definition condition that defines a migration job corresponding to partial migration that is part of data migration for replacement from the replace source storage system to the replace target storage system,
(C) select one or more volumes from the volume set as one or more source volumes and create a migration job for the selected one or more source volumes, based on the management information in accordance with the job definition condition, the migration job being a job in which, for each of the selected one or more source volumes, a target volume that is a volume having the same capacity as that of the source volume is created in the replace target storage system, and in which data is migrated from each of the one or more source volumes to a corresponding one of the one or more target volumes,
(D) respectively execute a plurality of migration jobs respectively corresponding to a plurality of partial migrations included in the data migration,
(E) display, using the capacity of a plurality of source volumes for the replace source storage system, progress in terms of the capacity of target volumes for which data has been migrated to the replace target storage system.

2. The management system according to claim 1, wherein the progress display in (E) is a display in which, for each of the replace source storage system and the replace target storage system, the volume capacity for data migrated by a completed migration job is distinguished from the volume capacity for data being migrated by a migration job in execution.

3. The management system according to claim 2, wherein a plurality of replace source storage systems is present for the replace target storage system, and
the progress display in (E) is a target progress display and a plurality of source progress displays deployed in the same screen, the target progress display is a display of the progress for the replace target storage system, the plurality of source progress displays corresponds to the respective replace source storage systems, and each of the source progress displays is a display of progress for the replace source storage system corresponding to the source progress display, and
a display mode of a source progress display of a replace source storage system corresponding to a migration job in a suspension state is a display mode meaning the suspension state.

4. The management system according to claim 3, wherein the progress display in (E) is a snapshot display that is the plurality of source progress displays and the target progress display deployed in one screen, and the processor is configured to
(F) display, for the replace target storage system, time-series changes in the progress of data migration from the plurality of replace source storage systems, and
the processor is configured to receive a designation of a time for the display in (F) and perform the snapshot display in (E) at the designated time.

5. The management system according to claim 1, wherein the volume set includes a plurality of volumes accessed by one or more hosts, the job definition condition is a host, and
in (C), when the job definition condition represents a host, the selected one or more source volumes are all volumes accessed by the host identified in accordance with the job definition condition.

6. The management system according to claim 1, wherein, when the volume set includes a primary volume paired with a secondary volume, the processor is configured to create, during migration job execution in (D), a pair having, as a primary volume, a target volume corresponding to a source volume serving as the primary volume.

7. A management method for replacement from a replace source storage system to a replace target storage system, the replacement including data migration that is migration of data in a volume set held by the replace source storage system to the replace target storage system, the management method comprising:
(A) receiving a designation of the replace target storage system among the plurality of storage systems;
(B) receiving a designation of the replace source storage system among the plurality of storage systems,
(C) receiving a job definition condition that defines a migration job corresponding to partial migration that is part of data migration for replacement from the replace source storage system to the replace target storage system,
(D) selecting one or more volumes from the volume set as one or more source volumes and creating a migration job for the selected one or more source volumes, in accordance with the job definition condition, the migration job being a job in which, for each of the one or more source volumes, a target volume that is a volume having the same capacity as that of the source volume is created in the replace target storage system, and in which data is migrated from each of the one or more source volumes to a corresponding one of the one or more target volumes,
(E) executing each of a plurality of migration jobs corresponding to a plurality of partial migrations included in the data migration,
(F) displaying, using the capacity of a plurality of source volumes for the replace source storage system, progress in terms of the capacity of target volumes for which data has been migrated to the replace target storage system.

* * * * *